United States Patent
Eichenberger et al.

(10) Patent No.: US 8,572,586 B2
(45) Date of Patent: *Oct. 29, 2013

(54) OPTIMIZED SCALAR PROMOTION WITH LOAD AND SPLAT SIMD INSTRUCTIONS

(75) Inventors: Alexandre E. Eichenberger, Chappaqua, NY (US); Michael K. Gschwind, Chappaqua, NY (US); John A. Gunnels, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,435

(22) Filed: Jul. 23, 2012

(65) Prior Publication Data

US 2012/0290816 A1  Nov. 15, 2012

Related U.S. Application Data

(63) Continuation of application No. 12/134,495, filed on Jun. 6, 2008, now Pat. No. 8,255,884.

(51) Int. Cl.
*G06F 9/30* (2006.01)
(52) U.S. Cl.
USPC ............................ 717/136; 717/101; 712/200
(58) Field of Classification Search
USPC ................. 717/106, 136, 141, 144, 146, 149; 712/4
See application file for complete search history.

(56) References Cited

U.S. PATENT DOCUMENTS

| | | | | |
|---|---|---|---|---|
| 4,710,872 | A * | 12/1987 | Scarborough | 717/160 |
| 5,021,945 | A | 6/1991 | Morrison et al. | |
| 6,772,415 | B1 * | 8/2004 | Danckaert et al. | 717/161 |
| 7,065,634 | B2 * | 6/2006 | Lewis et al. | 712/227 |
| 7,168,069 | B1 * | 1/2007 | Sigmund | 717/140 |
| 7,257,657 | B2 | 8/2007 | DeWitt, Jr. et al. | |
| 7,290,255 | B2 | 10/2007 | DeWitt, Jr. et al. | |
| 7,293,164 | B2 | 11/2007 | DeWitt, Jr. et al. | |
| 7,296,130 | B2 | 11/2007 | Dimpsey et al. | |
| 7,299,319 | B2 | 11/2007 | Dimpsey et al. | |
| 7,313,788 | B2 * | 12/2007 | Ben-David et al. | 717/150 |

(Continued)

OTHER PUBLICATIONS

Vector LoadSplat2007, Power ISA Version 2.05, IBM, (Oct. 23, 2007), see pp. 275-279.*

(Continued)

*Primary Examiner* — Don Wong
*Assistant Examiner* — Theodore Hebert
(74) *Attorney, Agent, or Firm* — Stephen J. Walder, Jr.; William Stock

(57) ABSTRACT

Mechanisms for optimizing scalar code executed on a single instruction multiple data (SIMD) engine are provided. Placement of vector operation-splat operations may be determined based on an identification of scalar and SIMD operations in an original code representation. The original code representation may be modified to insert the vector operation-splat operations based on the determined placement of vector operation-splat operations to generate a first modified code representation. Placement of separate splat operations may be determined based on identification of scalar and SIMD operations in the first modified code representation. The first modified code representation may be modified to insert or delete separate splat operations based on the determined placement of the separate splat operations to generate a second modified code representation. SIMD code may be output based on the second modified code representation for execution by the SIMD engine.

21 Claims, 17 Drawing Sheets

(56) References Cited

U.S. PATENT DOCUMENTS

| | | |
|---|---|---|
| 7,386,703 B2 * | 6/2008 | Sandon et al. .................... 712/4 |
| 2006/0190700 A1 * | 8/2006 | Altman et al. ..................... 712/7 |
| 2007/0162900 A1 * | 7/2007 | Biswas et al. ................. 717/136 |
| 2007/0174825 A1 | 7/2007 | Eichenberger et al. |
| 2007/0233766 A1 | 10/2007 | Gschwind |
| 2008/0092125 A1 * | 4/2008 | Archambault et al. ....... 717/140 |
| 2009/0307656 A1 | 12/2009 | Eichenberger et al. |

OTHER PUBLICATIONS

Vector LoadSplat2006, Addendum to the e200z6 PowerPC Core Reference manual, Rev. 0, Freescale Semiconductor, Inc. (2006), p. 10.*

USPTO U.S. Appl. No. 12/134,495.

* cited by examiner

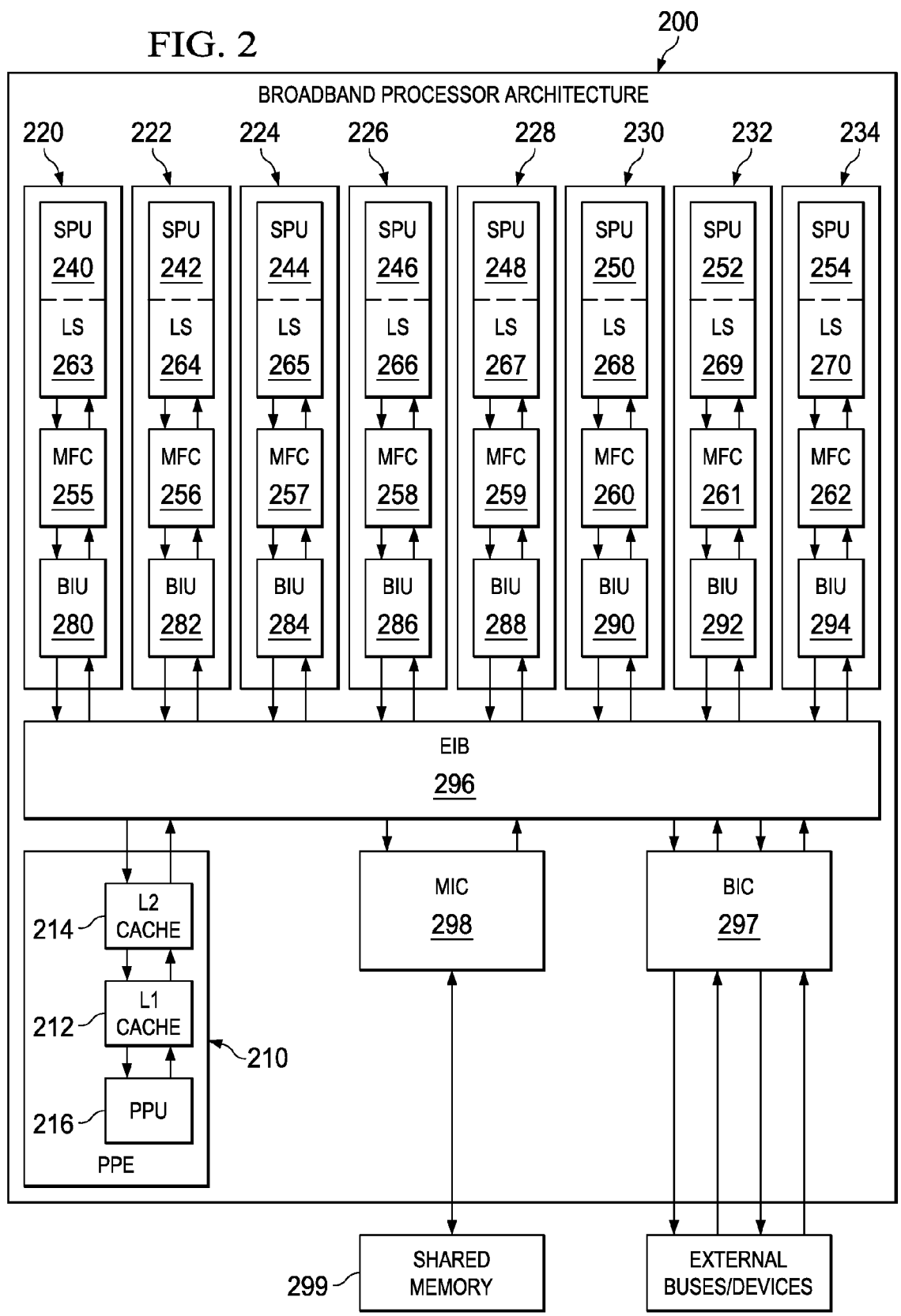

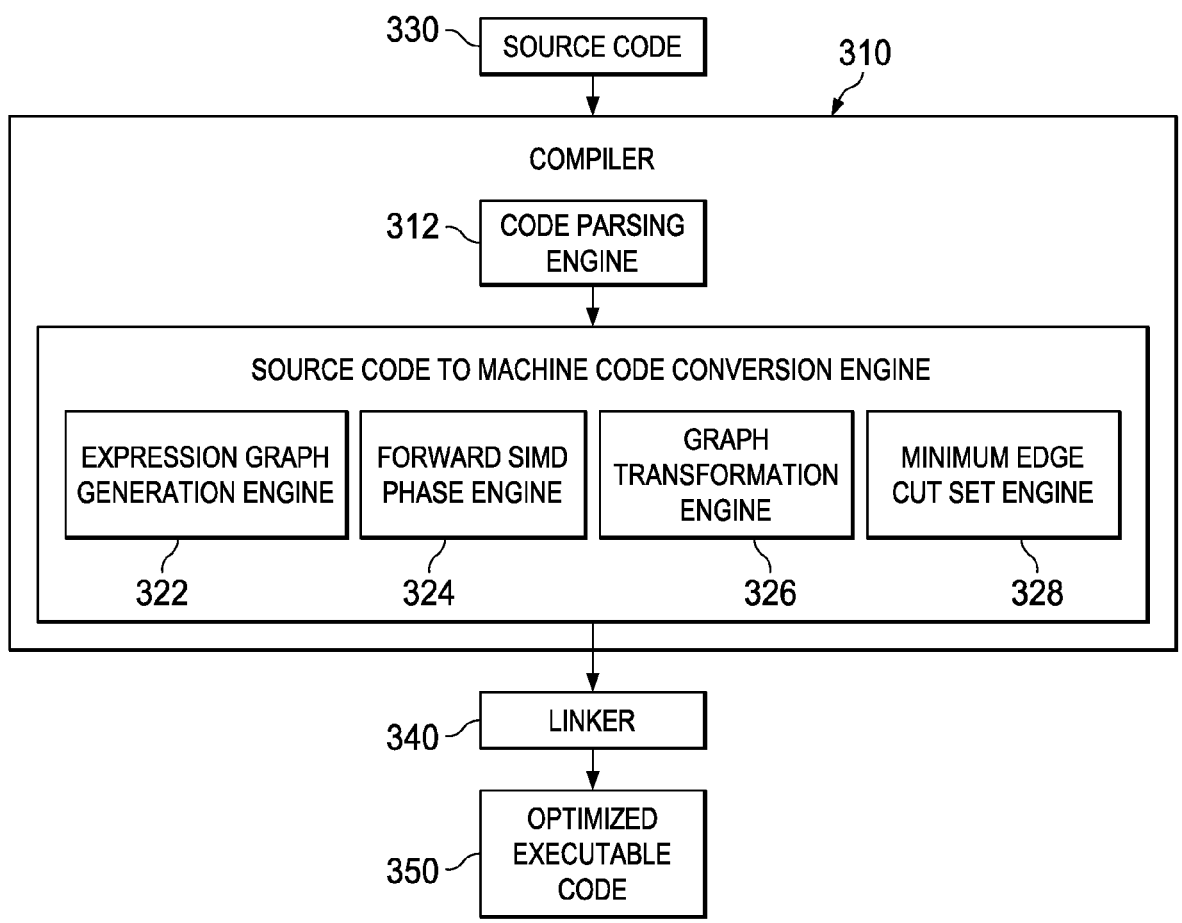

OPTIMIZED SCALAR PROMOTION WITH LOAD AND SPLAT SIMD INSTRUCTIONS

This application is a continuation of application Ser. No. 12/134,495, filed Jun. 6, 2008, status awaiting publication.

This invention was made with United States Government support under Contract No.: B554331 awarded by Department of Energy. The Government has certain rights in this invention.

BACKGROUND OF THE INVENTION

1. Field of the Invention

The present application relates generally to an improved data processing apparatus and method and more specifically to mechanisms for providing optimized scalar promotion with load and splat single instruction multiple data (SIMD) instructions.

2. Background of the Invention

Processor architectures initially were based on scalar operations in which a processor operates on a single value in a scalar register per processor cycle. Such scalar processors represent the simplest class of computer processors. In an effort to increase the speed of computations, vector processors were developed in which a single instruction operates simultaneously on multiple data items. Vector processors are also referred to as single instruction multiple data (SIMD) processors. SIMD exploits data level parallelism by allowing a single instruction to apply the same operation to multiple data elements in parallel. SIMD units employ vector registers which store multiple data elements.

The first era of SIMD machines was characterized by supercomputers like the Cray X-MP. These machines operated on long vectors, for example adding two vectors of 100 numbers each. Supercomputing moved away from the SIMD approach when multiple instruction multiple data (MIMD) approaches became more powerful, and interest in SIMD waned. Later, personal computers became common, and became powerful enough to support real-time gaming. This created a mass demand for a particular type of computing power, and microprocessor vendors turned to SIMD to meet the demand. The first widely-deployed SIMD for gaming was Intel's MMX extensions to the x86 architecture. IBM and Motorola then added AltiVec to the POWER architecture, and there have been several extensions to the SIMD instruction sets for both architectures. These developments have been oriented toward support for real-time graphics, and are therefore oriented toward vectors of two, three, or four dimensions.

While vector or SIMD processing has become prevalent in modern computing devices, programmers still find it easier to use traditional scalar programming techniques when generating computer program source code. Traditional programming allows a programmer to program using scalar instructions with the compiler performing auto-vectorization for optimizing the instructions for implementation on vector processors using SIMD engines. Alternatively, programmers may natively program instructions for vector execution using SIMD engines. However, in such cases, scalar operations tend to still exist in the vectorized or SIMDized code with additional instructions inserted to handle the transition from scalar operation to vector or SIMD operation. These additional instructions represent a significant source of overhead, with regard to consumed processor cycles, required to execute the vectorized code.

BRIEF SUMMARY OF THE INVENTION

In one illustrative embodiment, a method, in a data processing system, is provided for optimizing scalar code executed on a single instruction multiple data (SIMD) engine of the data processing system. The method may comprise determining placement of vector operation-splat operations based on an identification of scalar and SIMD operations in an original code representation. The method may further comprise modifying the original code representation to include the vector operation-splat operations based on the determined placement of vector operation-splat operations to generate a first modified code representation. Moreover, the method may comprise determining placement of separate splat operations based on identification of scalar and SIMD operations in the first modified code representation. Furthermore, the method may comprise modifying the first modified code representation to insert or delete separate splat operations based on the determined placement of the separate splat operations to generate a second modified code representation. SIMD code may be output based on the second modified code representation for execution by the SIMD engine.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an exemplary block diagram of a data processing system in which exemplary aspects of an illustrative embodiment may be implemented;

FIG. 3 is an exemplary block diagram of a compiler in accordance with one illustrative embodiment;

DETAILED DESCRIPTION OF THE INVENTION

Figure 1A:
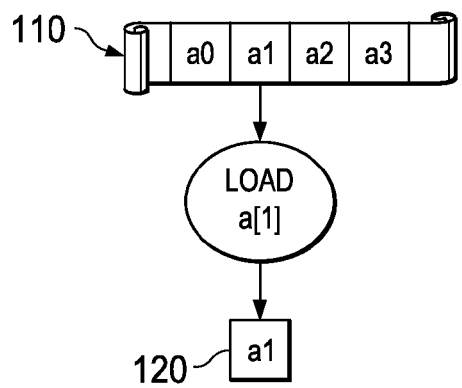
FIG. 1A is an exemplary diagram illustrating a scalar load operation as may be performed in a scalar processor.

As mentioned above, single instruction multiple data (SIMD) engines of SIMD processors operate on vectors to perform various SIMD operations of vector and scalar instructions. A vector is basically a row of individual numbers, e.g., scalar values. A scalar processor works on scalar values one at a time. However, a vector processor, or SIMD processor, lines up a whole row of scalar values, all of the same type, and operates on them as a unit.

Intra-element arithmetic, e.g., intra-element addition, is one of the basic SIMD operations that may be performed on SIMD vectors. Intra-element addition, for example, involves lining up two vectors, e.g., VA and VB, and adding their individual elements together to produce a sum vector (VT). Inter-element operations also include multiplication, multiply-add, average, and min operations. Non-arithmetic functions basically work the same way except that the particular operations, e.g., AND, OR, XOR, and the like, are different from the arithmetic operations.

Inter-element operations are operations that happen between the elements in a single vector. As an example, inter-element addition sums across the elements in a single vector and stores the result in an accumulation vector. Examples of inter-element SIMD operations include alignment support instructions, permutation and formatting instructions, pack instructions, unpack instructions, merge instructions, splat instructions, and shift left/right instructions.

As discussed above, scalar processing operates on an individual value while vector operations, such as performed in SIMD processors, operate on multiple values. Many times, SIMD processors must perform operations involving scalar values using their vector registers. For example, some operations generate scalar results which may then be operated upon by a vector or SIMD operation. Alternatively, scalar values may be loaded for use in a vector operation. Since vector or SIMD operations expect multiple values in the vector registers, a conversion is performed to cause the scalar value to look like a vector or MD value in the vector register. One inter-element SHAD operation used to make such a conversion is the "splat" operation used in the VMX and SPE processor architectures. The splat operation essentially replicates the scalar value for all "slots" of a vector register prior to the vector operation being performed. A slot in a vector register refers to one of the individual scalar values in a vector register, the value being identified by its slot number, or position, in the vector register, starting from zero on the left hand size. For example, a vector containing 4 scalar values has values in slot 0, 1, 2, and 3 of that vector register. Similar operations to the "splat" operation may be provided under different names depending upon the particular processor architecture or instruction sets. To better understand the splat operation, it is first important to understand the difference between scalar and vector operations, such as a scalar load operation and vector load operation.

FIG. 1A is an exemplary diagram illustrating a scalar load operation as may be performed in a scalar processor. As shown in FIG. 1A, a load instruction, load a[1], for loading a scalar value "a1" essentially takes the scalar value a1 from a data store 110, such as memory, a hard disk, or any other data storage device, and loads that scalar value into a scalar register 120 for use by the processor.

Figure 1B:
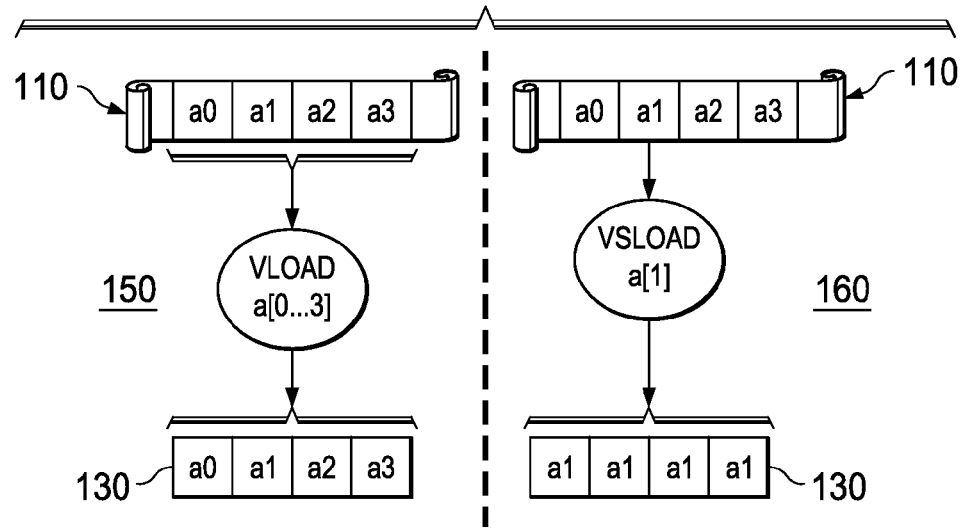
FIG. 1B is an exemplary diagram illustrating a vector load operation as may be performed in a vector processor or SIMD processor.

FIG. 1B is an exemplary diagram illustrating a vector load operation as may be performed in a vector processor or SIMD processor. As shown in FIG. 1B, a vector load instruction 150, vload a[0 . . . 3], for loading a vector value comprising the scalars a0 to a3 essentially takes the values a0 to a3 from the data store 110 and loads those values into "slots" of a vector register 130 for use by the processor. Now, if a scalar value, such as a[1], is to be loaded into the vector register 130, the scalar load operation is performed to one of the slots of the vector register 130. However, since the vector operation is expecting to see and operate on four valid values, i.e. a valid value in each of the four slots of the vector register 130, a splat operation is performed to replicate the a[1] scalar value into the other three slots of the vector register 130. This scalar load and splat operation to the vector register 130 may be performed by a vector splat load (vsload) instruction 160. If the operation to be performed on the scalar value a[1] is a scalar operation, then the operation may be performed immediately following the scalar load operation, but the result may be subject to a splat operation in order to ensure proper operation of subsequent vector operations.

Thus, some vector units allow scalar loads into a vector register. For these machines, an explicit splat is needed if the scalar value is expected to be replicated in all slots. Other machines do not allow scalar loads into a register file. On these machines, a vector load into a vector register must be issued even though the other values brought in by the vector load are not needed. Once the vector register is filled, the desired value may be isolated and splat so as to replicate it into all the slots of the vector register, if required. Other machines have scalar load and splat operations that directly load a scalar value into a vector register and splat it so as to replicate that scalar value to each of the slots in the destination vector register.

Figure 1E:
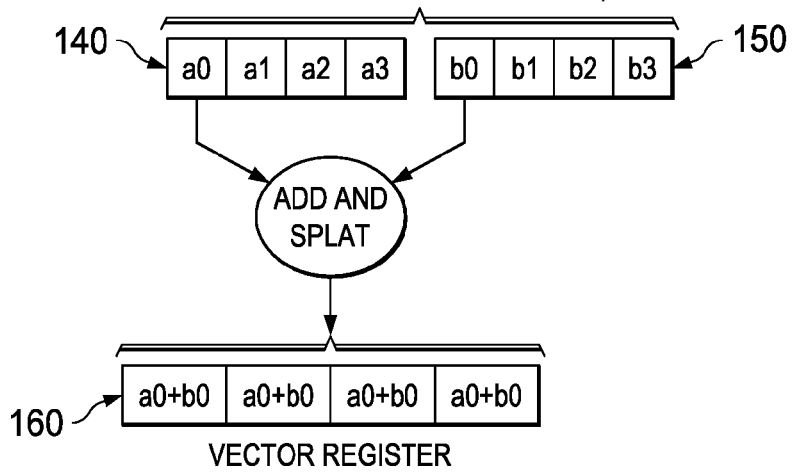
FIG. 1E is an exemplary diagram illustrating a "add and splat load" operation.
Figure 1C:
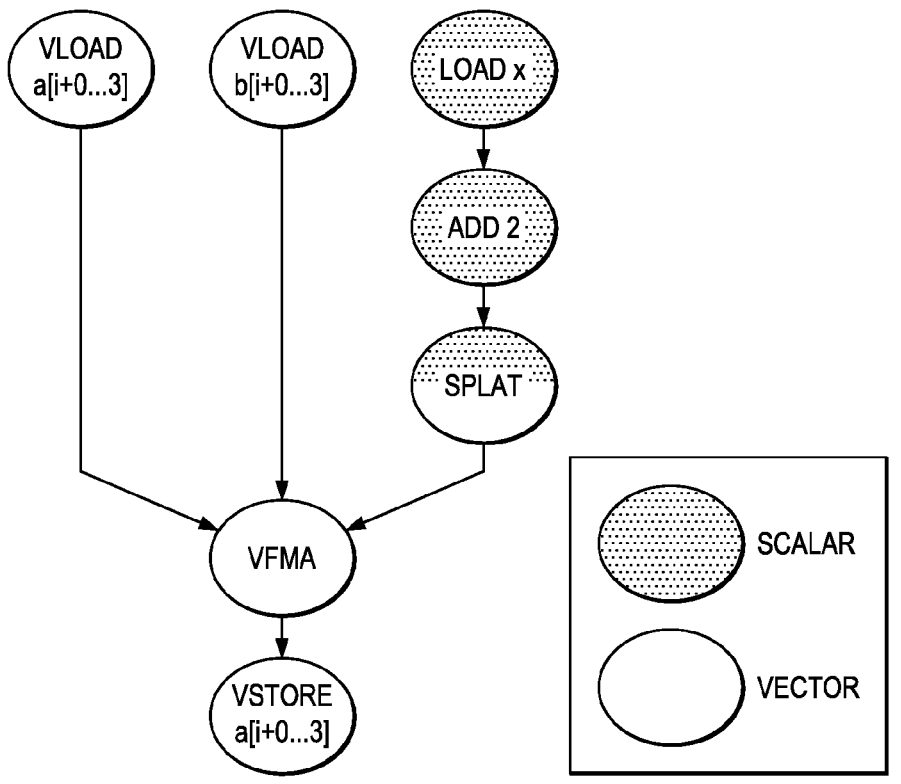
FIG. 1C is an exemplary flow diagram illustrating a load/splat operation sequence for performing a SIMD operation.

FIG. 1C is an exemplary flow diagram illustrating a load/splat operation sequence for performing a SIMD operation. The particular SIMD operation is a vector floating point multiply add (vfma) operation on vector values of a[i+0 . . . 3] and b[i+0 . . . 3], and a scalar value x. As shown in FIG. 1C, a scalar load of the scalar x value is performed followed by a scalar add operation for adding the scalar value "2" to the scalar value of "x". Thereafter, a vector splat operation is performed to replicate the result of the scalar add operation in each of the slots of the vector register to which the result is loaded so that the vfma operation may be performed properly. Vector load instructions are performed to load the vector values a[i+0 . . . 3] and b[i+0 . . . 3]. Thereafter, the vfma operation is performed on the vector values a[i+0 . . . 3], b[i+0 . . . 3], and the result of the splat operation. The resulting vector value is stored in a vector register using the vstore vector operation.

Figure 1D:
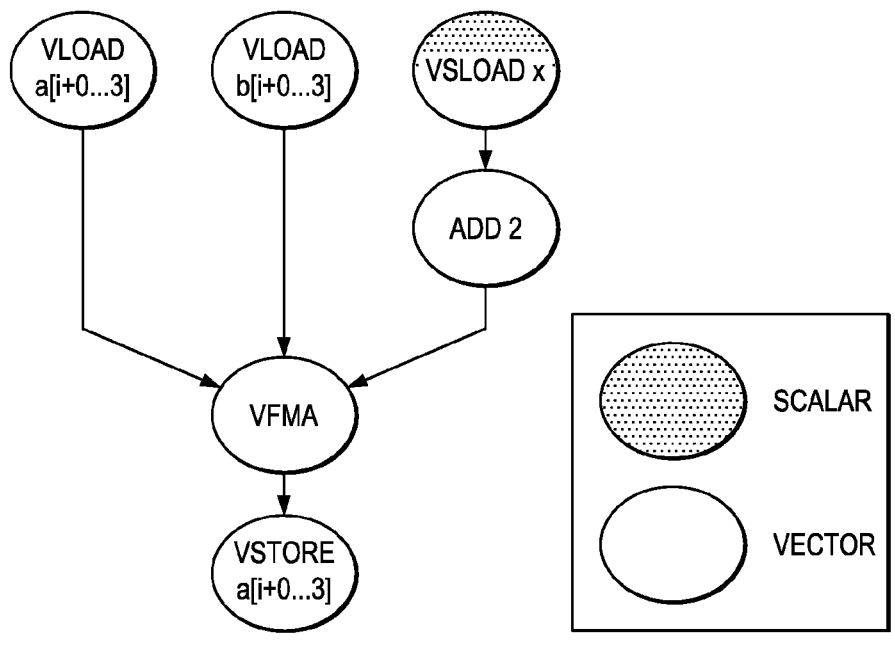
FIG. 1D is an example of a vector load splat operation.

The separate splat operation following the scalar load of the scalar value x, and application of the scalar add operation, represents a significant source of overhead in the execution of code within the processor. It is thus, desirable to eliminate or at least reduce the need for such separate splat operations while still providing the same functionality for performing SIMD operations on vector and scalar values. To this end, a vector load splat operation is provided that essentially performs the "splat" operation "for free," i.e. without having to have a separate splat instruction. An example of a vector load splat operation is shown in FIG. 1D. As shown in FIG. 1D, the load of the scalar value x is directly splatted and then the add operation as well as the other operations are performed in a SIMD fashion using vector operations. Thus, in the load/splat sequence of FIG. 1C, the scalar code may be of the type a[i]=a[i]+(x+2)*b[i] causing the operation to be performed sequentially for each a[i] and b[i] value. Alternatively, the operation may perform x'=(x+2) in a sequential manner, splat the x' value into a vector register, and then perform a[i]=a[i]+x'*b[i] using SIMD instructions. However, in the vector load splat operation of FIG. 1D, the SIMD code may be of the type a[i+0 . . . 3]+(x+2)*b[i+0 . . . 3] allowing each a[i] and b[i] value to be used in parallel computations using the vector registers of the SIMD processor architecture. Thus, the vector load splat operation eliminates the explicit separate splat instruction in FIG. 1C resulting in faster computation.

While a vector load splat operation is shown in FIG. 1D, it should be appreciated that this free splat operation may be generalized to any "operation and splat" operation, such as an "add and splat" operation or the like. Thus, for example, as shown in FIG. 1E, for an "add and splat" operation, the values a0 and b0 from the two vector registers 140 and 150, which may alternatively be scalar registers if necessary, may be added and loaded in a combined operation which then splats the results of the add operation to each of the slots of the vector register 160. It should be noted that it is assumed that there is a unified scalar/SIMD register file so that the operation and splat take inputs from the scalar/SIMD register file. However, the mechanisms of the illustrative embodiments also work well on architectures where there are distinct scalar/SIMD register files. In such a case, one may have distinct splat and operation instructions, some with inputs from a scalar register file, some with inputs from SIMD register files, and some with inputs from arbitrary combination of both.

Unfortunately, not all operations or function calls may be SIMDizable using such vector load splat operations or "operation and splat" operations. An operation or function call may be non-SIMDizable because either the operation/function call does not have a corresponding SIMD version, i.e. vector version, or it is too expensive to implement the operation/function call in a SIMD manner. For example, consider a square root estimate operation. It is entirely conceivable that a given machine has a scalar version of this operation but does not have an equivalent SIMD version due to the rarity of square root computation in SIMD benchmarks. As a result, whenever the rare computation in which a square root is required within an otherwise SIMD computation is encountered, a SIMD version of that estimate is not available in the repertoire of SIMD instructions. This is an example of a missing SIMD operation.

Consider now a 64 bit integer multiply operation. Many processors, such as the Power6™ processor available from International Business Machines Corporation of Armonk, N.Y., support scalar 64×64 bit integer multiply into a 64 bit scalar result as a single scalar operation. On the Power6™ processor, the largest integer multiply in the SIMD unit is a SIMD 16×16 bit integer multiply into a 32 bit vector register within the SIMD unit. In order to build a 64×64 bit integer multiply using 16×16 bit multiply operations, 7 of these 16×16 bit integer multiply operations are required, not counting extra data move operations that are needed so as to align specific 16 bit quantities in identical slots so as to perform the proper combination of 16×16 bit multiply as required by the 64×64 bit integer multiply operation. Now, assume here that 8 such data move operations are required for the 64×64 bit integer multiply operation. Thus, to summarize, when encountering a 64 bit integer multiply in a SIMD computation, there is the choice between using 2 scalar 64×64 integer multiply operations or 7+8=15 SIMD instructions to compute the same result in a SIMD fashion. This is an example where it is more efficient to use scalar operations than SIMD operations even though there are SIMD operations that can provide a similar functionality.

Consider now a function call made by the user to a "sin," "cos," or "1/x" operation from a standard math library. In order for the compiler to replace such a "sin(x)" function call into a SIMD version of "sin_v(v)" where v is now a vector register and the output of "sin_v" is also a vector register, several things must happen. First, the compiler must ensure that the "sin" call is indeed a call to a standard math library function, and not some other unrelated user implemented function that happened to be named "sin." Second, the compiler must have access to either the code implementing the "sin" operation from the math library, and must generate on the fly a related SIMDized version of the "sin" where both input and output are vector register, or, if the compiler does not have access to the code from the math library, it must have access to a SIMDized version of the math library that the complier can call in order to call a SIMDized version of the "sin" operation. If for any reason, the above requirement fails, then the compiler cannot generate a SIMD version of the scalar function call provided by the user.

Note that for purposes of this description, an operation is referred to as "non-SIMDizable," or being "scalar-only," when a given operation or function call has either no equivalent SIMD operation or has equivalent SIMD operations that are not deemed to be profitable compared to the scalar version of that operation. Thus, for purposes of the description of the illustrative embodiments, it is assumed hereafter that, for whatever reason, and solely for the purpose of illustration, the compiler is not able to find a SIMDized version of "sin," "cos," and "a/x."

Figure 1F:
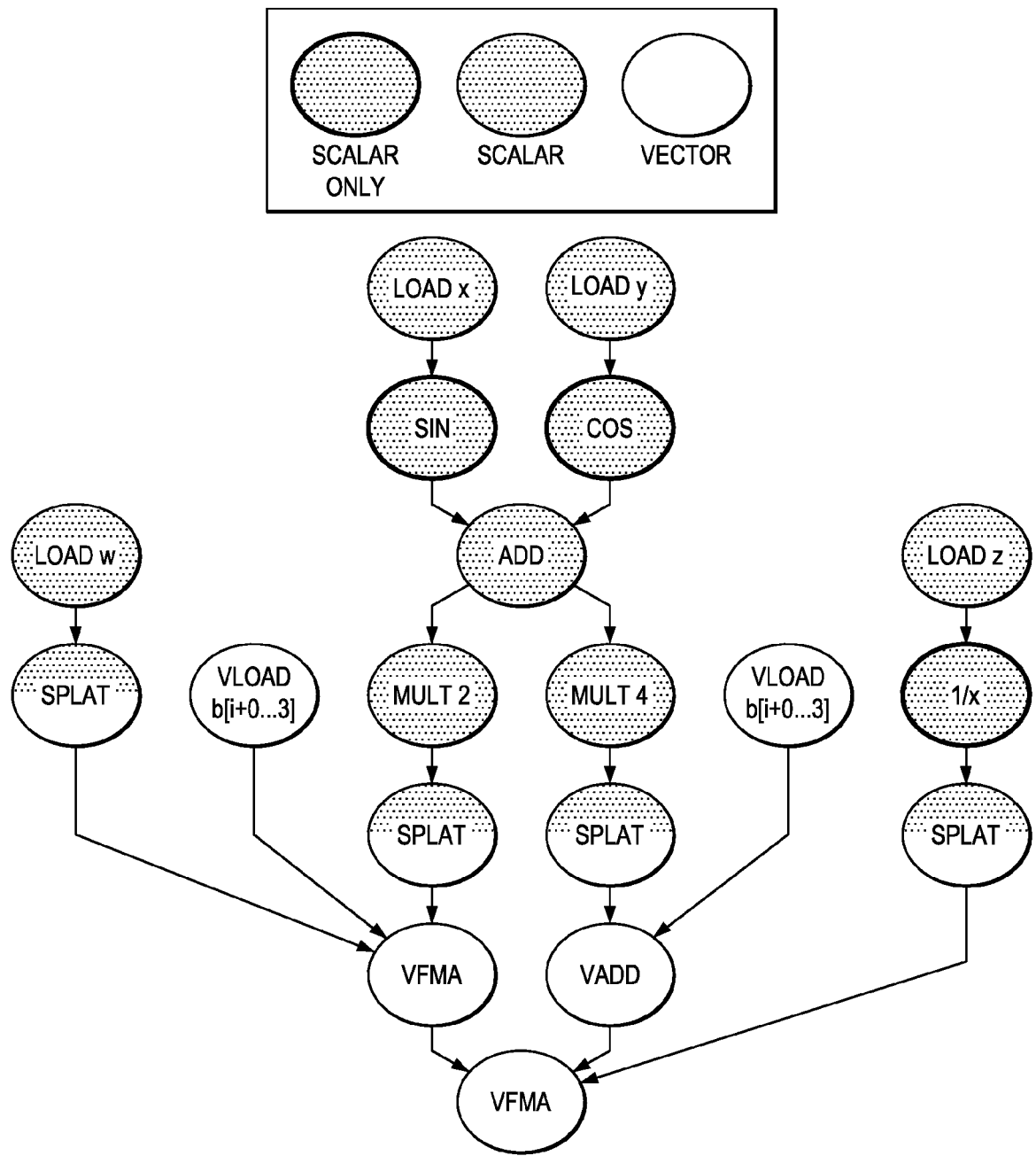
FIG. 1F illustrates a load/splat sequence for a set of operations involving non-SIMDizable instructions/function calls, i.e. sin, cos, and 1/x.

In situations where code is to be converted from a scalar based coding to a SIMD code, a known compiler typically converts the scalar code into a SIMDized code by inserting splat instructions after the all the scalar instructions. For example, FIG. 1F illustrates a load/splat sequence for a set of operations involving non-SIMDizable instructions/function calls, i.e. sin, cos, and 1/x. As can be seen from FIG. 1F, splat instructions 170-180 are inserted after scalar operations at the border between scalar and vector operations (scalar only operations, i.e. non-SIMDizable operations are shown with a dark border and shading, scalar operations are shown with shading, and vector operations are shown with no shading). As mentioned above, the separate splat operations increase the overhead in performing operations within a SIMD processor architecture.

In order to reduce this overhead, the mechanisms of the illustrative embodiments provide the compiler with logic for determining where to use the vector splat load instructions and further provide logic for determining an optimum location for traditional splat operations. In a first phase, the compiler changes all scalar operations to an operation and splat operation where possible and useful. In a second phase, the compiler determines, for all SIMDizable scalar operations, i.e. non-scalar only operations, if all inputs are SIMD inputs, i.e. vector inputs. If all of the inputs to the SIMDizable scalar operation are SIMD inputs, then the SIMDizable scalar operation is changed to a corresponding SIMD operation. Changing an operation to a SIMD version is performed only if it is profitable to do so, e.g., using the equivalent scalar operation does not require fewer resources. This second phase is repeated until a steady state is obtained. Then, in a third phase, any splat operations that have a SIMD operation on both its input and output are removed. The result is an optimized SIMD coding in which vector splat load instructions are utilized and traditional splat operations are located at optimum locations within the SIMDized coding.

Thus, the illustrative embodiments provide mechanisms for optimizing scalar code executed on a single instruction multiple data (SIMD) engine by determining optimum placement of vector splat load operations and traditional splat operations in compiled SIMD code. As such, the illustrative embodiments may be implemented in any data processing system using a SIMD engine and SIMD registers. One such data processing system is the Cell Broadband Engine (CBE) data processing system available from International Business Machines, Inc. of Armonk, N.Y. The CBE architecture will be used as a basis for the description of the illustrative embodiments. However, it should be appreciated that the CBE architecture is only illustrative and is not intended to state or imply any limitation with regard to the types of data processing systems or architectures in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 is an exemplary block diagram of a data processing system in which exemplary aspects of an illustrative embodiment may be implemented. The exemplary data processing system shown in FIG. 2 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 2, the CBE 200 includes a power processor element (PPE) 210 having a processor (PPU) 216 and its L1 and L2 caches 212 and 214, and multiple synergistic processor elements (SPEs) 220-234 that each has its own synergistic processor unit (SPU) 240-254, memory flow control 255-262, local memory or store (LS) 263-270, and bus interface unit (BIU unit) 280-294 which may be, for example, a combination direct memory access (DMA), memory management unit (MMU), and bus interface unit. A high bandwidth internal element interconnect bus (EIB) 296, a bus interface controller (BIC) 297, and a memory interface controller (MIC) 298 are also provided.

The CBE 200 may be a system-on-a-chip such that each of the elements depicted in FIG. 2 may be provided on a single microprocessor chip. Moreover, the CBE 200 is a heterogeneous processing environment in which each of the SPUs may receive different instructions from each of the other SPUs in the system. Furthermore, the instruction set for the SPUs is different from that of the PPU, e.g., the PPU may execute Reduced Instruction Set Computer (RISC) based instructions while the SPU execute vectorized instructions.

The SPEs 220-234 are coupled to each other and to the L2 cache 114 via the EIB 296. In addition, the SPEs 220-234 are coupled to MIC 298 and BIC 297 via the EIB 296. The MIC 298 provides a communication interface to shared memory 299. The BIC 297 provides a communication interface between the CBE 200 and other external buses and devices.

The PPE 210 is a dual threaded PPE 210. The combination of this dual threaded PPE 210 and the eight SPEs 220-234 makes the CBE 200 capable of handling 10 simultaneous threads and over 128 outstanding memory requests. The PPE 210 acts as a controller for the other eight SPEs 220-234 which handle most of the computational workload. The PPE 210 may be used to run conventional operating systems while the SPEs 220-234 perform vectorized floating point code execution, for example.

The SPEs 220-234 comprise a synergistic processing unit (SPU) 240-254, memory flow control units 255-262, local memory or store 263-270, and an interface unit 280-294. The local memory or store 263-270, in one exemplary embodiment, comprises a 256 KB instruction and data memory which is visible to the PPE 210 and can be addressed directly by software.

The PPE 210 may load the SPEs 220-234 with small programs or threads, chaining the SPEs together to handle each step in a complex operation. For example, a set-top box incorporating the CBE 200 may load programs for reading a DVD, video and audio decoding, and display, and the data would be passed off from SPE to SPE until it finally ended up on the output display. At 4 GHz, each SPE 220-234 gives a theoretical 32 GFLOPS of performance with the PPE 210 having a similar level of performance. The memory flow control units (MFCs) 255-262 serve as an interface for an SPU to the rest of the system and other elements. The MFCs 255-262 provide the primary mechanism for data transfer, protection, and synchronization between main storage and the local storages 263-270. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

In accordance with the illustrative embodiments, the SPEs 220-234 may implement SAO engines having SIMD registers. The illustrative embodiments provide a compiler for optimizing executable code for execution on such SIMD engines in SPEs 220-234. In particular, the illustrative embodiments optimize the placement of vector splat load operations and traditional splat operations so that scalar operations may be performed using such SIMD registers with a minimum of overhead.

With the mechanisms of the illustrative embodiments, a compiler is provided with an optimization engine that performs scalar to SIMD code conversion using optimized splat-instruction insertion for reducing the overhead associated with executing the SIMD code. The compiler parses source code and, for each statement in the program, generates an expression graph. The compiler then transforms the expression graph according to the logic provided in the compiler for converting scalar code to SIMD code with optimized splat operation insertion. In particular, the compiler inspects the operations in the expression graph and determines where vector splat load operations may be used. The compiler further inspects the operations in the expression graph to determine which SIMDizable scalar operations may be changed to SIMD operations based on the inputs to these SIMDizable scalar operations. Splat operations in the expression graph that have SIMD operations on both their input and output sides may then be removed. The executable code is then generated for the expression graph.

It is this executable code that may be distributed to the SPEs 220-234 for execution. Since the SPEs 220-234 are SIMD engines having SIMD registers, the executable code is optimized for performance of scalar operations using these SIMD engines and SIMD registers. In particular, through implementing the illustrative embodiments, optimized SIMD code is generated for execution by the SPEs 220-234 that minimizes the overhead associated with performing scalar and SIMD operations using SIMD processor resources. This overhead is minimized by using vector splat load operations where possible and performing optimum placement of splat operations so as to reduce the overall number of splat operations required. Thus, processor cycles that would be required to execute separate splat operations are saved by implementation of the optimizations of the illustrative embodiments.

FIG. 3 is an exemplary block diagram of a compiler in accordance with one illustrative embodiment. As shown in FIG. 3, a compiler 310 is provided that includes a code parsing engine 312 and a source code to executable code conversion engine 320. The compiler 310 receives source code 330 as input which is parsed by code parsing engine 312. The parsed source code segments are provided to source code to executable code conversion engine 320 which converts the higher level source code representation into an executable code that is understandable by the data processing system. Such operations are generally known in the art and thus, a detailed explanation of the conversion from source code to executable code is not provided herein.

In addition to the generally known mechanisms for converting source code to executable code, the conversion engine 320 includes an expression graph generation engine 322, a forward SIMD phase engine 324, a graph transformation engine 326, and a minimum edge cut engine 328. The elements 322-328 are used to implement the methodology of the illustrative embodiments on the parsed source code 330.

Specifically, the expression graph generation engine 322 generates, for each statement in the parsed source code 330, an expression graph which may take the form of a dependency directed acyclic graph (DAG), for example. The generation of expression graphs for statements in source code is generally known in the art and thus, a detailed explanation is not provided herein. Those of ordinary skill in the art are aware of the available mechanisms for generating expression graphs.

With the illustrative embodiments, the generated expression graph is examined by the forward SIMD phase engine 324 to identify scalar operations where the scalar operation output leads into a SIMD computation. The compiler distinguishes between scalar and vector operations in the expression graph by use of different operations and symbolic register types. The compiler can distinguish in the source language between scalar and vector operations encoded by a programmer, and the optimizing component of the compiler can distinguish between scalar operations and vector operations which it may create by SIMDization or vectorization transformations.

Scalar operations identified as having outputs that lead into a SIMD computation, and which have a corresponding "vector operation and splat" instruction, are replaced by the forward SIMD phase engine 324, with a corresponding vector operation and splat operation. All SIMDizable scalar operations in the expression graph are identified and, for each of these SIMDizable scalar operations, a determination is made as to whether all of the inputs to the SIMDizable scalar operation are SIMD or not. If so, then the SIMDizable scalar operation is changed to a SIMD operation, provided it is beneficial to do so. This is repeated until a steady state is reached.

Splat operations that have only SIMD inputs and SIMD outputs are removed since such splat and SIMD inputs/outputs are essentially dead code. The result is a first modified expression dependency directed acyclic graph (DAG) that is the result of a first phase of compiler optimization. The resulting first modified expression dependency DAG is then transformed in a second phase of compiler optimization by the graph transformation engine 326. This second phase of compiler optimization separates nodes having multiple outputs into a plurality of nodes, adds a generic scalar start node, replaces each scalar only node (non-SIMDizable node) with labeled edges, adds a generic vector stop node, replaces each splat node by an edge from a predecessor node to the generic vector stop node, and removes nodes not reachable from the generic scalar start node, as discussed in greater detail hereafter. The output of this second phase of operation is a second modified expression dependency DAG.

In a third phase of compiler optimization, the minimum edge cut set engine 328 uses a minimum edge cut set algorithm to split the first modified expression dependency DAG such that scalar nodes are separated from vector or SIMD nodes. The resulting cut set is used to insert splat operations in the first modified expression dependency DAG. The result of this third phase of compiler optimization is a third modified expression dependency DAG in which scalar load operations are replaced with vector splat load operations where possible and splat operations are inserted at optimum locations within the expression dependency DAG. This third modified expression dependency DAG is then used to generate optimized executable code.

The optimized executable code, which has been optimized for scalar operations performed on SIMD engines, is provided to the linker 340 which links appropriate executable code modules to generate the optimized executable code 350 that is optimized for execution by SIMD processors, such as the SIMD engines of the SPEs in the Cell Broadband Engine data processing system. The optimized executable code 350 may then be stored or otherwise provided to the SPEs or other SIMD processors for actual execution. The actual execution of the optimized executable code 350 will utilize less processor resources since the overhead associated with extraneous separate splat operations is minimized.

Figure 4:
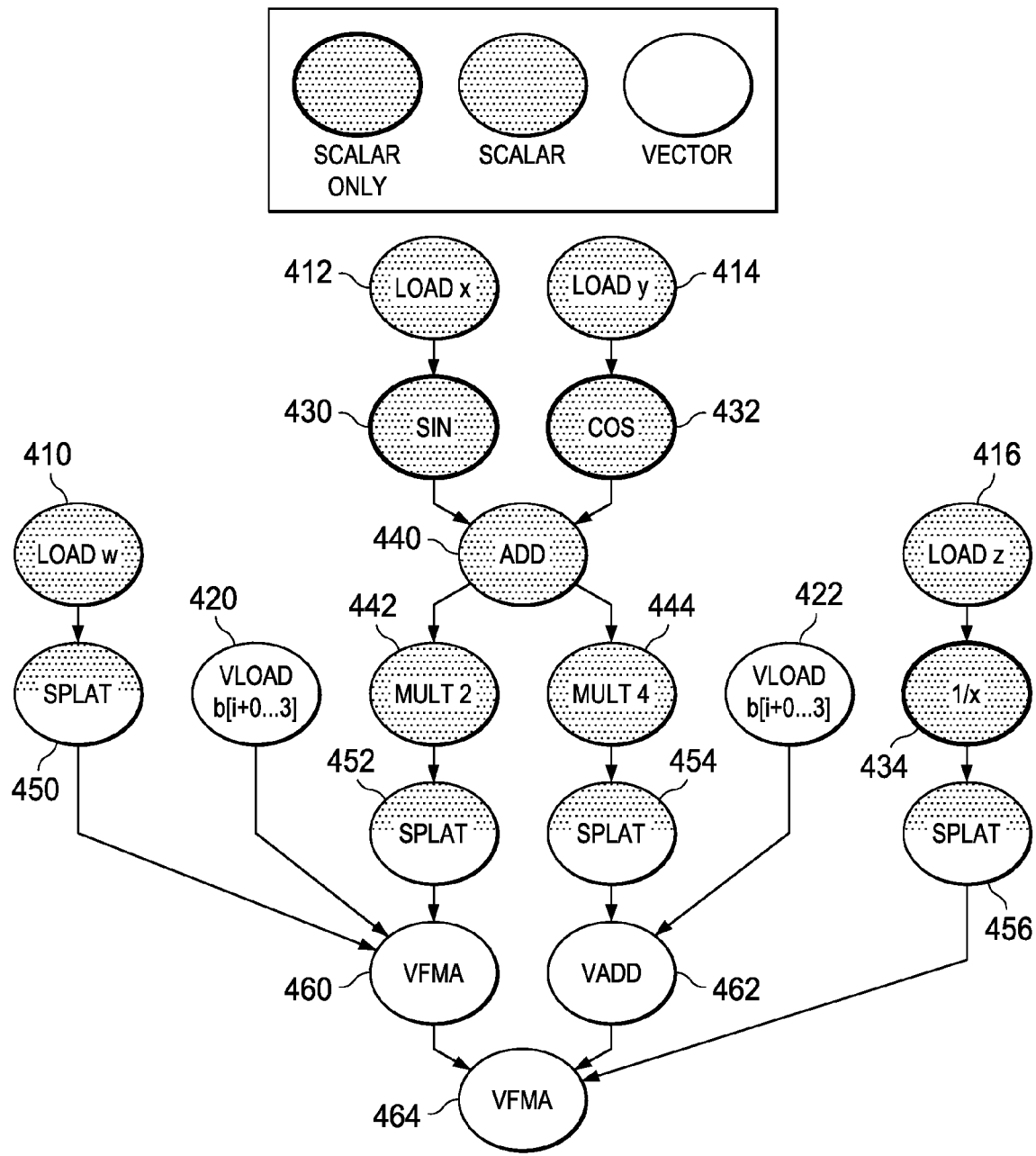
FIG. 4 is an exemplary diagram of an expression dependency directed acyclic graph (DAG) that may be generated for a statement in source code.

To better illustrate the operation of the various engines 324-328, FIG. 4 is provided as one example of an expression graph dependency directed acyclic graph (DAG) that may be generated for a statement in source code. In the depiction shown in FIG. 4, and the following figures, scalar only operations are shown as shaded with dark borders, scalar operations are shown as shaded, and vector operations are shown as unshaded. Operations which border scalar and vector operations are shown as partly shaded.

As shown in FIG. 4, the expression dependency DAG includes scalar load instructions 410-416 for loading scalar values w, x, y, and z. The scalar values x, y, and z are operated on by scalar only operations 430-434. The scalar only operations 430-434 are scalar operations which cannot be SIMDized (for the purpose of illustration here). The output of the scalar only operations 430 and 432 are provided to the scalar add operation 440 which generates two outputs to scalar multiplication operations 442 and 444.

Because the outputs of scalar operations 410, 434, 442, and 444 are to be operated on by vector or SIMD operations 460-464, splat operations 450-456 are typically inserted after the scalar operations 410, 434, 442, and 444, and prior to the SIMD operations 460-464. In addition, vector load instructions 420 and 422 are provided for loading vector value b[i+0 . . . 3] into vector operations 460 and 462. As discussed above, the separate splat operations shown in this expression graph represent a least optimized SIMD code.

Figure 5:
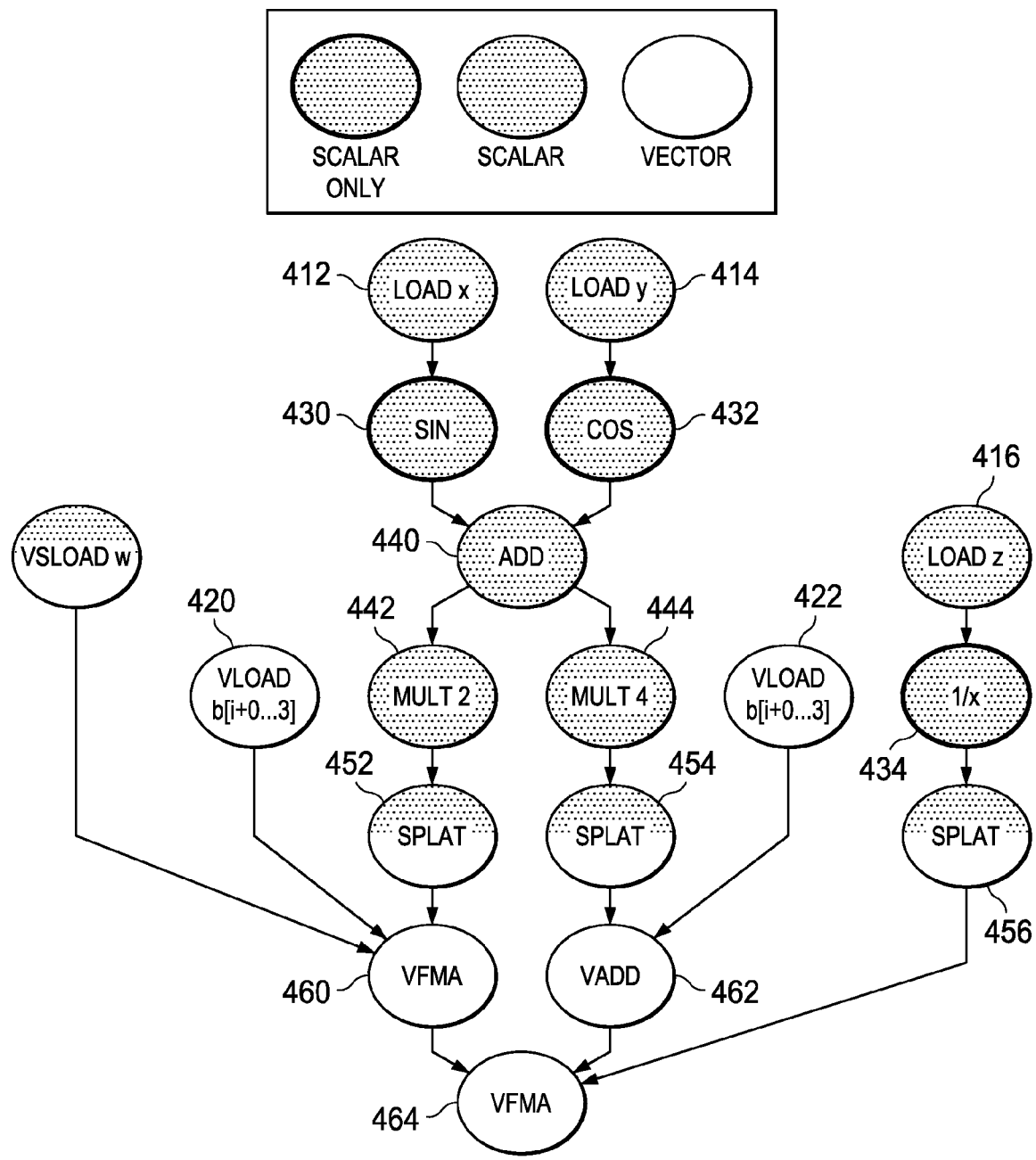
FIG. 5 illustrates a result of a first phase of the compiler optimization performed using the mechanisms of the illustrative embodiments.

FIG. 5 illustrates a result of a first phase of the compiler optimization performed using the mechanisms of the illustrative embodiments. The operation leading to the result shown in FIG. 5 may be performed, for example, by the forward SIMD phase engine 324 of the source code to executable code conversion engine 320 of the compiler 310 in FIG. 3. As shown in FIG. 5, when compared to FIG. 4, in this first phase, the forward SIMD phase engine 324 identifies scalar load operations in the expression graph where the scalar load operation output eventually leads to a SIMD, or vector, computation and which have comparable vectorized or SIMD "operation and splat" operations. Looking at the expression graph of FIG. 4, the scalar load operation node in the expression graph that fits this criteria is node 410, i.e. the scalar load operation for loading the scalar value w since this node 410 eventually leads to vector operation node 460. While scalar load operation nodes 412-416 also eventually lead to vector or SIMD computation nodes 462-464, these nodes are connected to scalar only nodes 430-434 and thus, these operations do not have a corresponding vectorized or SIMD operation that may be the basis for a "operation and splat" operation. Thus, the scalar load nodes 412-416 do not meet the criteria of this first phase of compiler optimization. Therefore, the scalar load operation of node 410 is changed to a vector splat load (vsload) operation while the scalar load operations of nodes 412-416 remain scalar load operations.

It can be seen from FIG. 5 that this change of the scalar load operation of node 410 to a vsload operation results in the elimination of one separate splat operation 450 associated with the loading of scalar value w. It should be noted that because the sin, cos, and 1/x scalar only operations 430-434 are non-SIMDizable, the three splat operation nodes 452-456 associated with these non-SIMDizable operations could not be removed.

Thereafter, for all SIMDizable scalar operations, if all the input are SIMD inputs, the SIMDizable scalar operation is changed to a SIMD operation. For example, if there were a scalar "multiply by 3" operation below the "load w" 410 and after the splat operation 450, then the inputs to this "multiply by 3" operation will be SIMD and the SIMDizable scalar operation is thus, changed to a SIMD operation. This operation is repeated until a stead state is reached, i.e. there are no further SIMDizable scalar operations to be changed to a SIMD operation. Splat operation nodes that have only SIMD inputs and SIMD outputs are then removed. The result of this first phase of operation is a first modified expression dependency DAG where certain scalar load operations are replaced with vector splat load, or operation and vector splat load, operations where possible.

FIGS. 6A-6E illustrate a second phase of compiler operation in accordance with one illustrative embodiment. This second phase of compiler operation is separated into five sub-phases or parts. The second phase of compiler operation may be performed, for example, by the graph transformation engine 326 of the source code to executable code conversion engine 320 of the compiler 310 in FIG. 3.

Figure 6A:
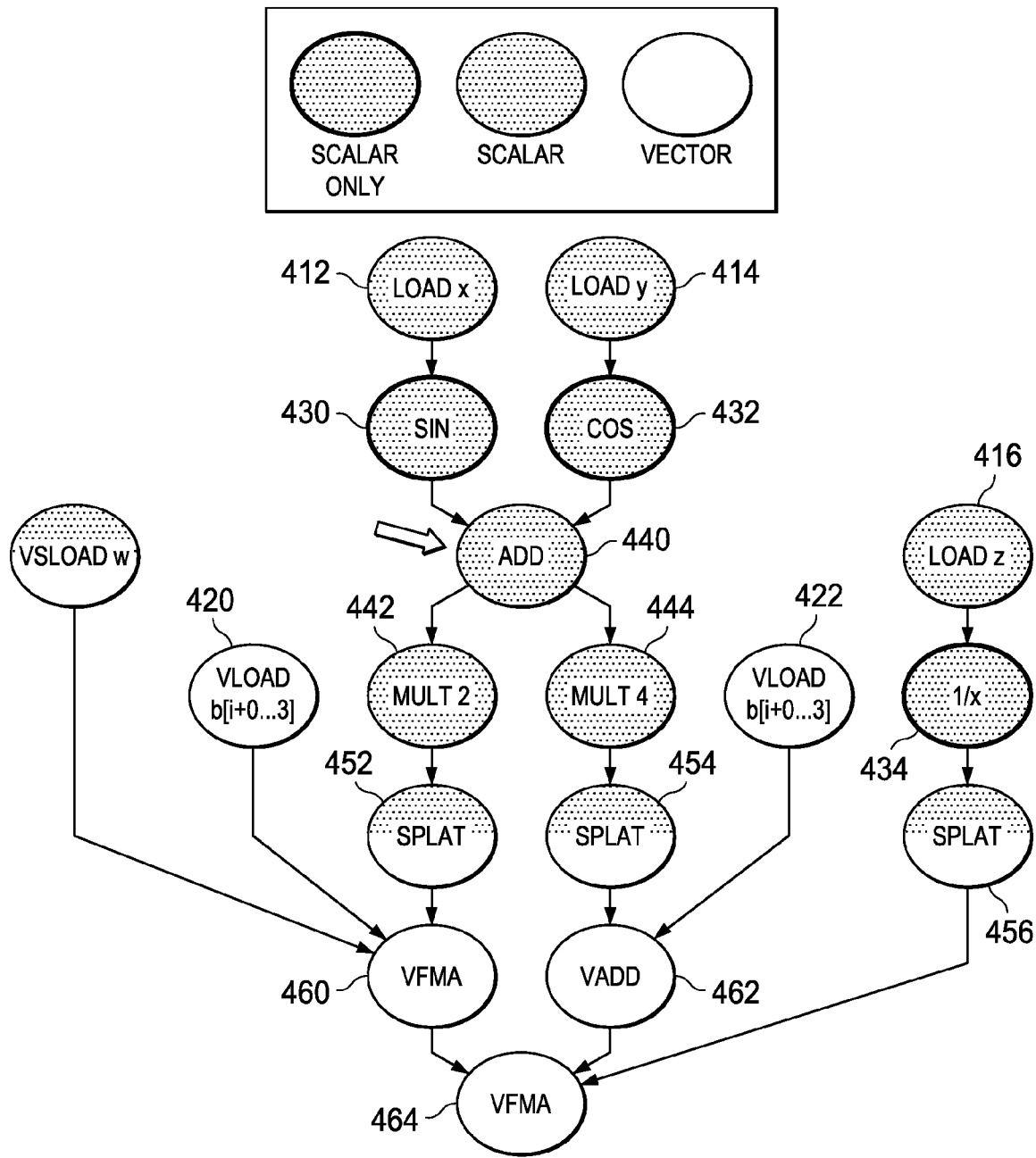
FIG. 6A illustrates a result of performing a first sub-phase or part of a second phase of compiler operation in accordance with one illustrative embodiment.

FIG. 6A illustrates a result of performing a first sub-phase or part of a second phase of compiler operation in accordance with one illustrative embodiment. In this first sub-phase or part of the second phase of compiler operation, each node X in the expression graph with multiple outputs is identified. In the depicted example, the only node in the expression graph meeting this criteria is node 440, which has outputs to scalar operations 442 and 444.

Figure 6B:
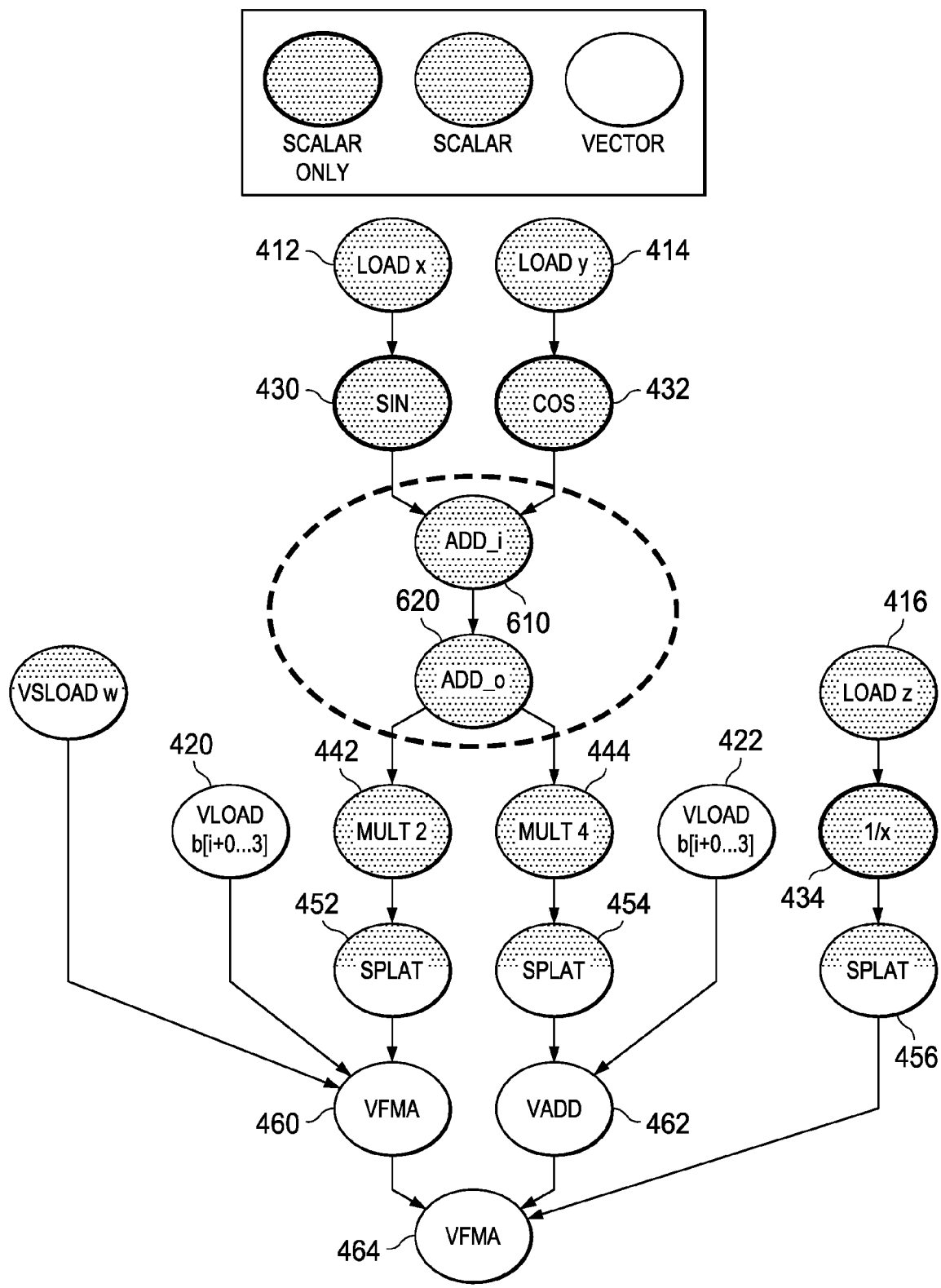
FIG. 6B illustrates a result of a second sub-phase or part of the second phase of compiler operation in accordance with one illustrative embodiment.

FIG. 6B illustrates a result of a second sub-phase or part of the second phase of compiler operation in accordance with one illustrative embodiment. In this second sub-phase or part of the second phase of compiler operation, the identified node 440 having multiple outputs is split into two separate nodes, a first node 610, labeled add_i, having all of the inputs to the originally identified node 440, and a second node 620, labeled add_o, having all of the outputs of the originally identified node 440. An edge is added between these two nodes 610 and 620 to generate the modified expression graph shown in FIG. 6B.

Figure 6C:
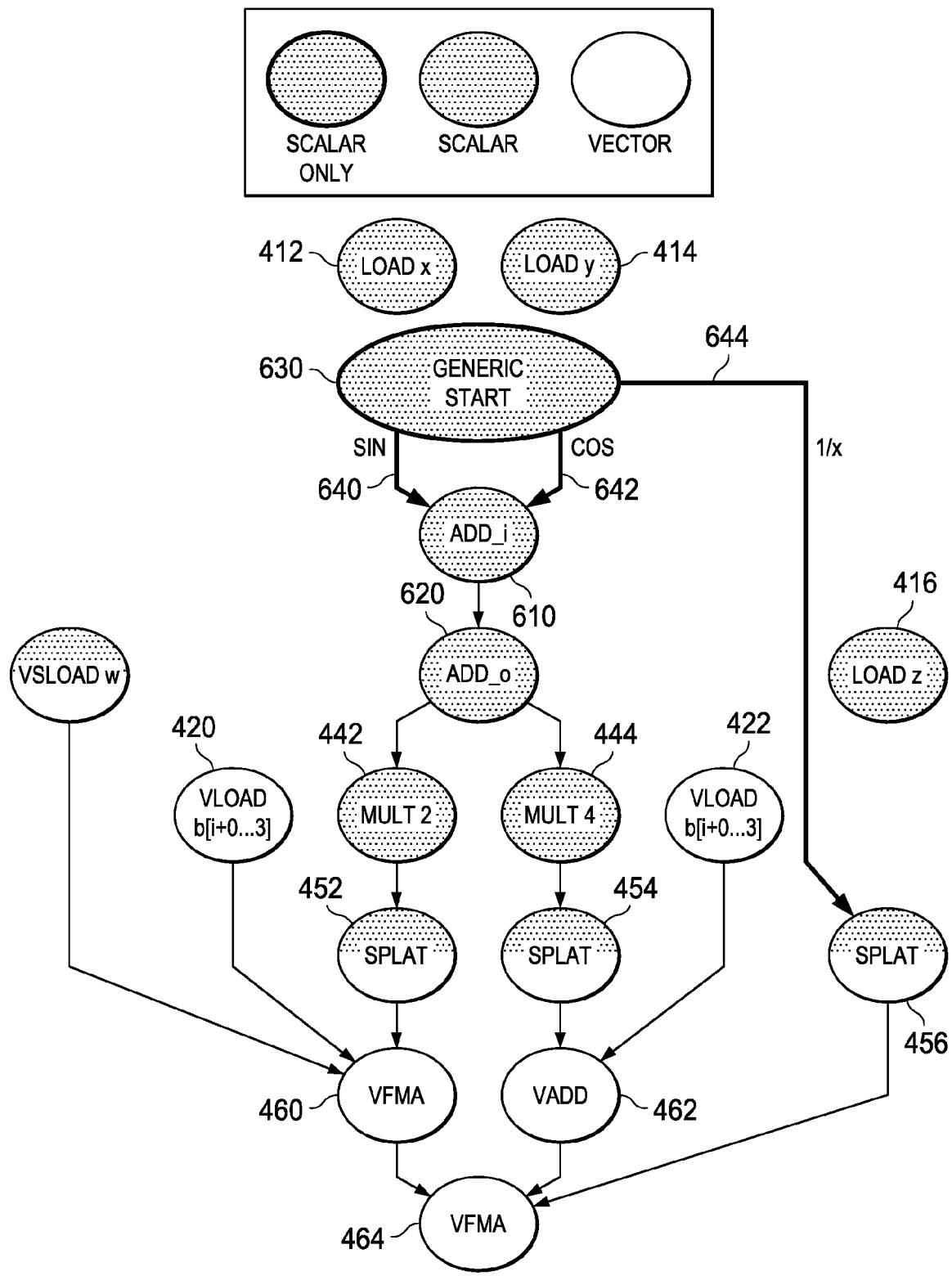
FIG. 6C illustrates a result of a third sub-phase or part of the second phase of compiler operation in accordance with one illustrative embodiment.

FIG. 6C illustrates a result of a third sub-phase or part of the second phase of compiler operation in accordance with one illustrative embodiment. As shown in FIG. 6C, a new generic scalar start node 630 is added. Each of the scalar only nodes 430-434 (sin, cos, and 1/x) are then removed and an edge is added for each of these removed nodes 430-434 from the generic scalar start node 630 to a single destination of the removed nodes 430-434. These new edges are labeled with the name of the removed node's operation, e.g., sin, cos, and 1/x. As a result, in the depicted example, there are three edges 640-644 from the generic scalar start node 630.

Figure 6D:
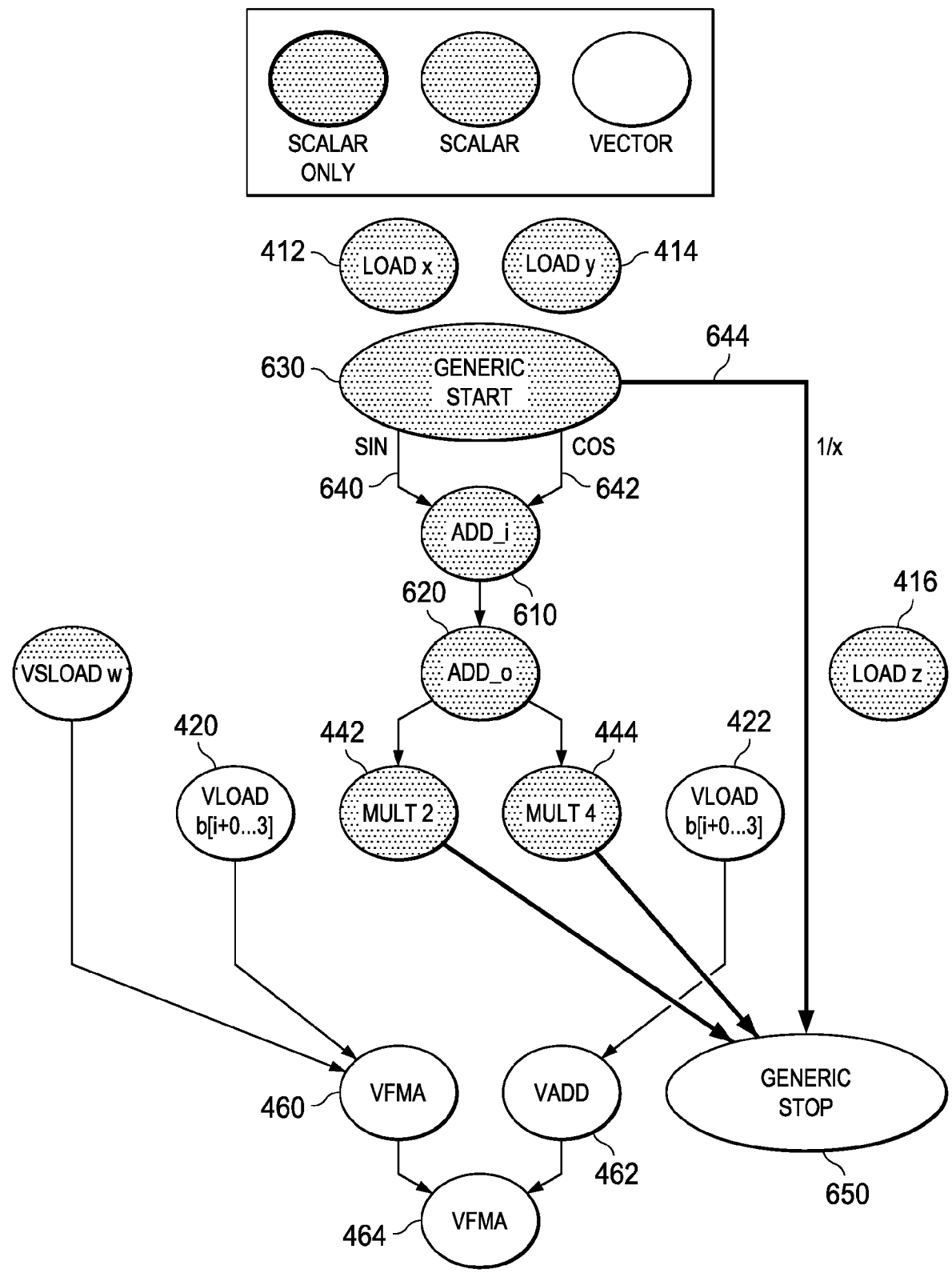
FIG. 6D illustrates a result of a fourth sub-phase or part of the second phase of compiler operation in accordance with one illustrative embodiment.

FIG. 6D illustrates a result of a fourth sub-phase or part of the second phase of compiler operation in accordance with one illustrative embodiment. As shown in FIG. 6D, a generic vector stop node 650 is added. All of the splat nodes 452-456 are then removed and edges from the predecessor node of each splat node 452-456 are added between the predecessor nodes, e.g., nodes 630 (for the 1/x operation), 442 and 444.

Figure 6E:
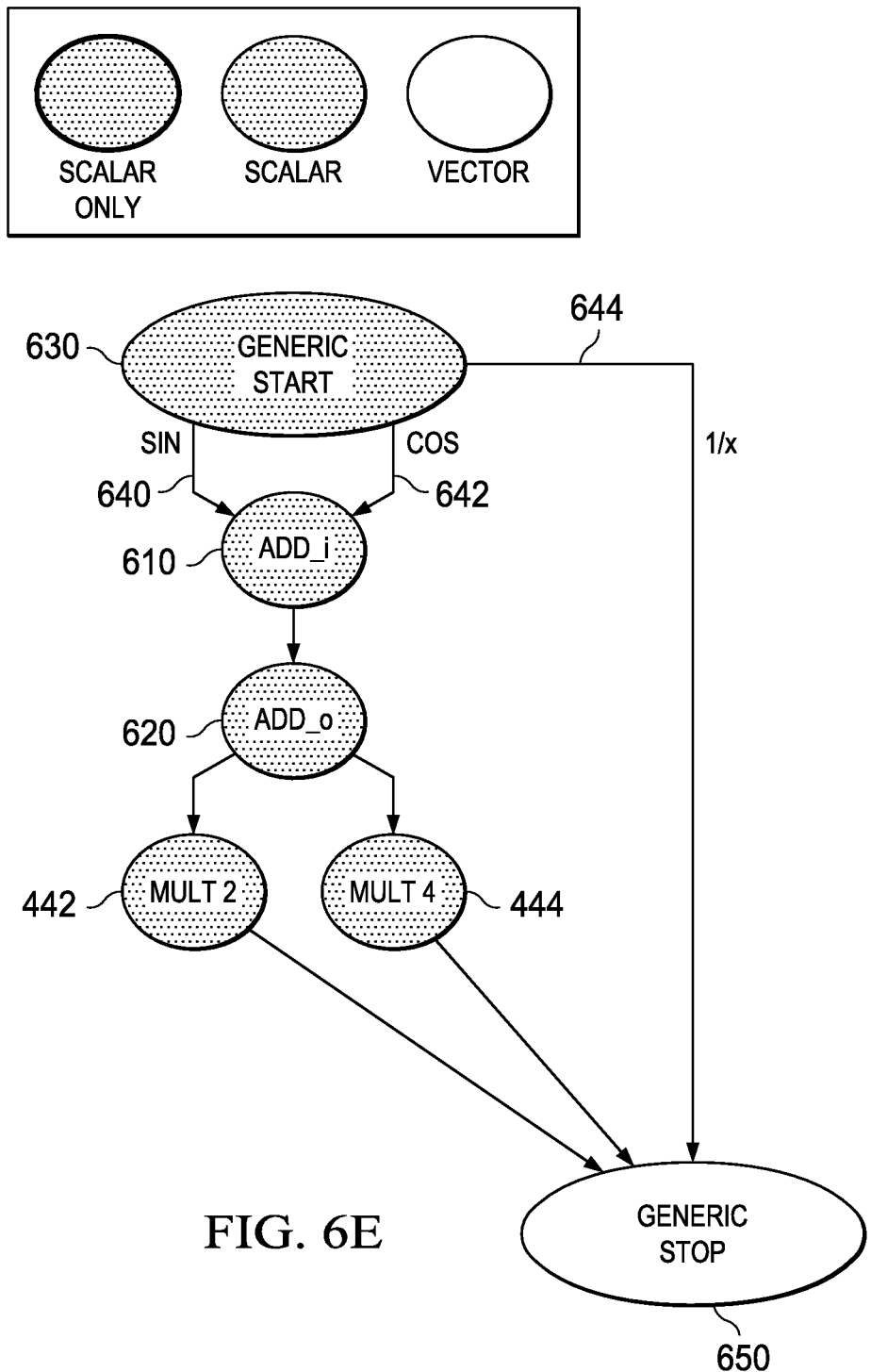
FIG. 6E illustrates a result of a fifth sub-phase or part of the second phase of compiler operation in accordance with one illustrative embodiment.

FIG. 6E illustrates a result of a fifth sub-phase or part of the second phase of compiler operation in accordance with one illustrative embodiment. As shown in FIG. 6E, the fifth sub-phase or part involves removing all nodes not reachable by from the generic scalar start node 630. Thus, only nodes 610, 620, 442, 444, and generic vector stop node 650 are reachable from the generic start node 630. The resulting expression dependency DAG shown in FIG. 6E represents the second modified expression dependency DAG that is the output of the second phase of compiler operation.

Looking at the second modified expression dependency DAG in FIG. 6E, it can be seen what has been achieved by the expression dependency DAG transformation performed by this second phase of compiler operation. As shown in FIG. 6E, there is a generic scalar start node 630 and a generic vector stop node 650, where the generic scalar start node 630 corresponds to the original scalar nodes of the expression graph and the generic vector stop node 650 corresponds to the original vectorized, or SIMD, nodes in the expression graph. At this point, in a third phase of the compiler operation, a minimum number of edges to remove (min edge cut set) is to be round so as to separate the expression graph into two distinct sets of nodes: the ones attached to the generic scalar start node 630 that correspond to scalar nodes, and the ones attached to the generic vector stop node that correspond to the SIMDized nodes. The edges that are removed are where the explicit conversion between scalar and vectorized, or SIMDized, code needs to occur.

Min edge cut set is a well known non-deterministic polynomial time (NP) complete problem and efficient heuristics, as well as optimal solvers, have been devised for this problem. Problems are designated as "NP-complete" if their solutions can be quickly checked for correctness, and if the same solving algorithm used can solve all other NP problems. Any known min edge cut set heuristic and/or solver may be used. It should be noted that each edge in the expression graph of FIG. 6E has a similar cost, i.e. a unit cost. However, the approach can be refined to assign weights corresponding to the impact of a splat along a given edge on the critical path or other performance metric.

Figure 7:
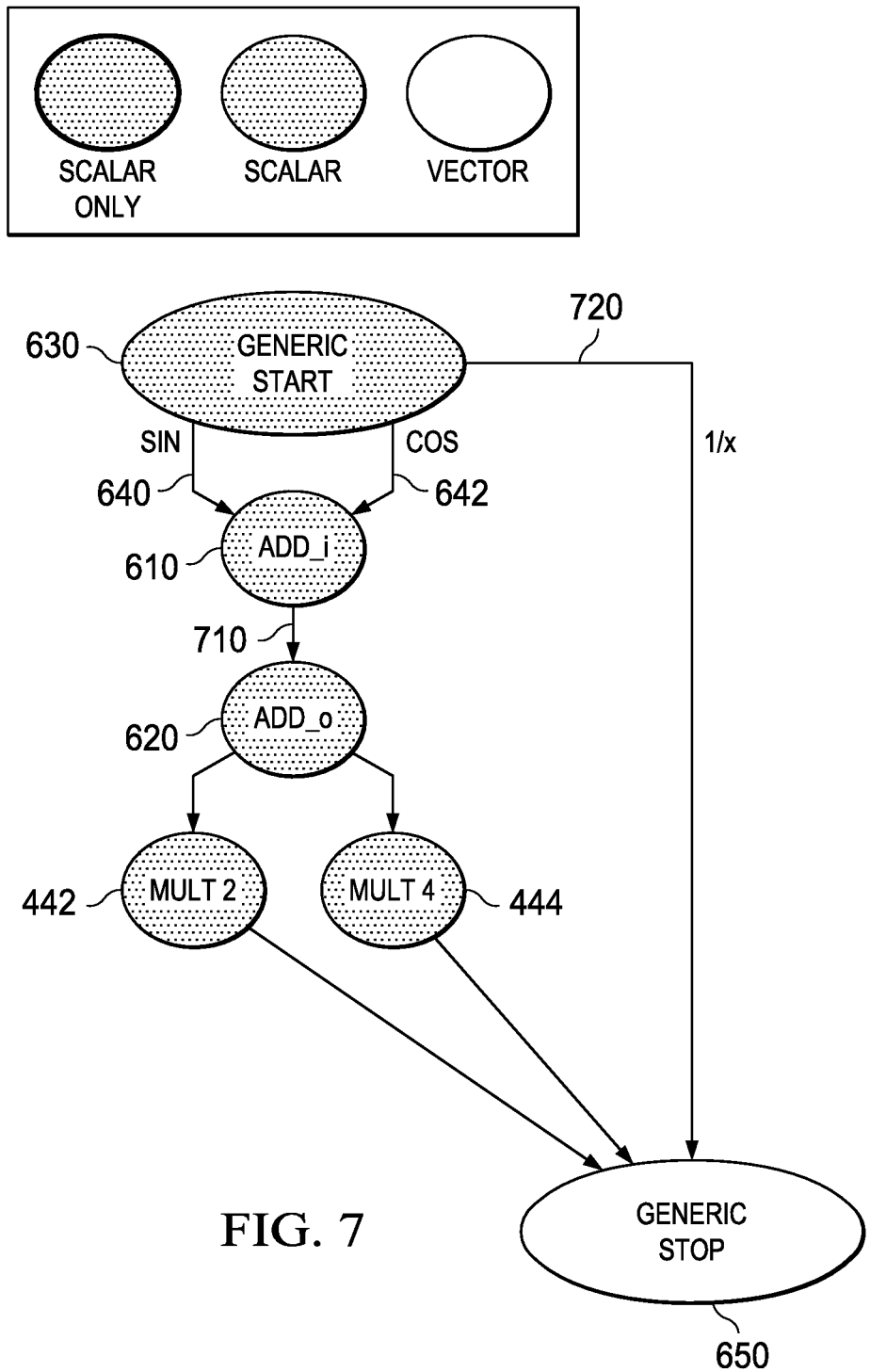
FIG. 7 is an exemplary diagram illustrating a result of a third phase of compiler operation in accordance with one illustrative embodiment.

FIG. 7 is an exemplary diagram illustrating a result of a third phase of compiler operation in accordance with one illustrative embodiment. This third phase of compiler operation may be performed, for example, by the splat operation insertion/removal engine 328 of the source code to executable code conversion engine 320 of the compiler 310 in FIG. 3. As shown in FIG. 7, essentially, the min edge cut set operation seeks to completely sever the generic scalar start node 630 from the generic vector stop node 640 by cutting a minimum number of edges. In the depicted example, it is assumed that all of the edges have the same unit cost and thus, there is no preference for cutting certain edges over others other than to achieve a minimum number of edge cuts. Thus, the minimum number of edge cuts in the depicted example is to cut the edge 710 between the add_i and add_o nodes 610-620 and the 1/x edge 720 from the generic scalar start node 630 to the generic vector stop node 650. This completely separates the scalar portion of the expression graph from the vector portion of the expression graph.

Having identified the minimum number of edge cuts needed, the cut edges are then correlated with the first modified expression dependency DAG in FIG. 5 to determine where separate explicit splat operation nodes are to be inserted or maintained. That is, for each labeled edge that is in the minimum edge cut set, e.g., the 1/x edge 720 in the depicted example, a splat operation is inserted or maintained after the operation node corresponding to the edge's label. For each non-labeled edge that is in the minimum edge cut set, a splat operation is placed along that edge. For nodes such as the add node 440 in FIGS. 5 & 6A, which was split into two nodes 610 and 620 in FIGS. 6B-6D, a splat operation is added after the original node (prior to splitting) when the internal edge between the split nodes 610 and 620 is selected. Namely, in the depicted example, since edge 710 in FIG. 7 was selected, and this edge corresponds to an edge added while splitting the original node 440 in FIGS. 5 & 6A into nodes 610 and 620 in FIGS. 6B-6D, then a splat operation is added after the original node 440.

Figure 8:
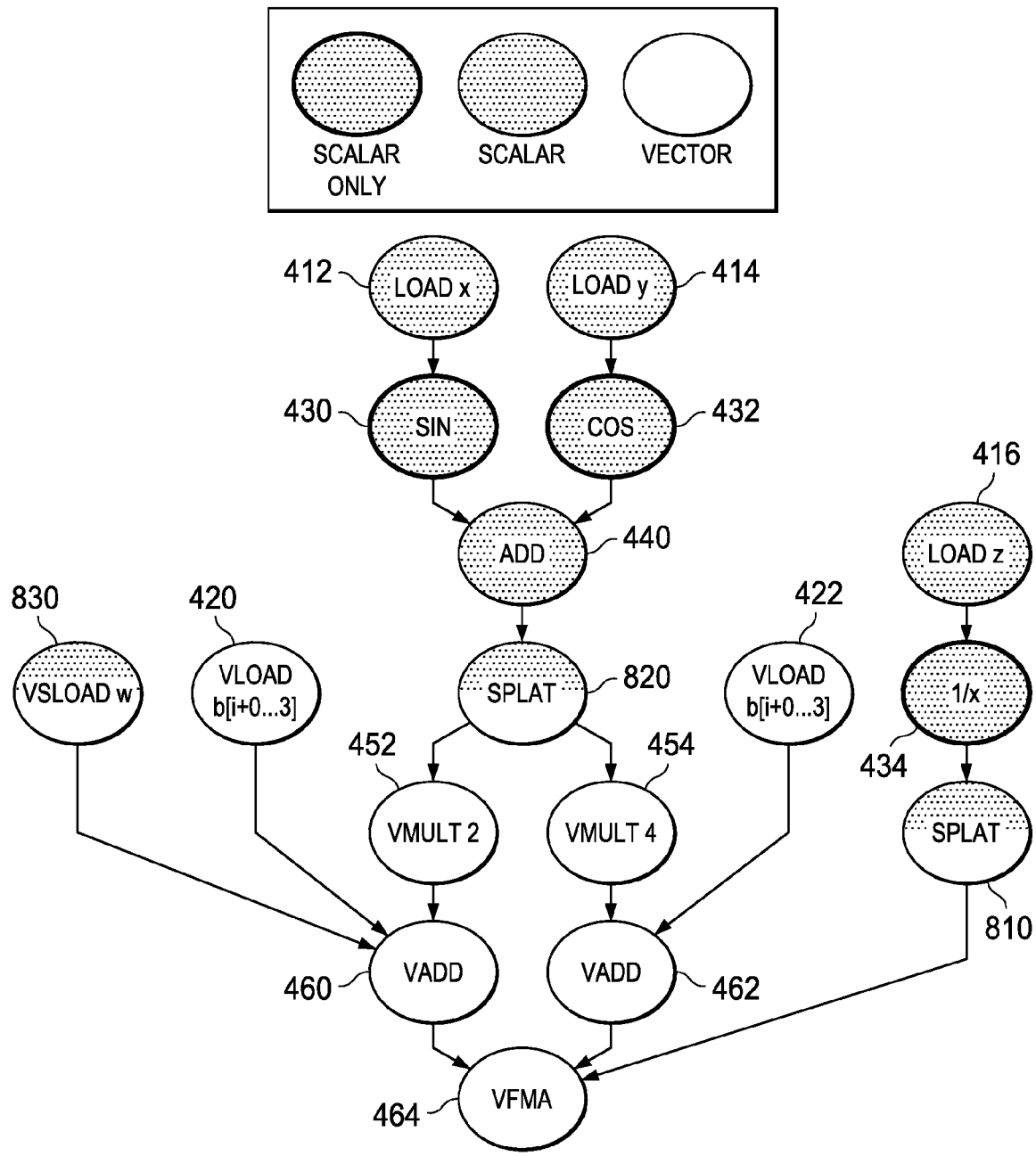
FIG. 8 is an exemplary diagram illustrating the third modified expression dependency DAG generated as a result of the third phase of compiler operation in accordance with one illustrative embodiment.

FIG. 8 is an exemplary diagram illustrating the third modified expression dependency DAG generated as a result of the third phase of compiler operation in accordance with one illustrative embodiment. As shown in FIG. 8, when compared to the first modified expression dependency DAG of FIG. 5, a splat operation node 810 is inserted after the 1/x scalar only operation node 434 and a splat operation node 820 is inserted after the scalar operation node 440. Thus, from FIG. 8 it can be seen that by inserting the vector splat load operation 830 where possible and determining an optimum location for splat operations that moves the splat operations to less costly portions of the expression dependency DAG, two separate splat operations are removed from the typical SIMD code thereby reducing the overhead associated with splat operations by half. Therefore, the illustrative embodiments provide mechanisms for optimizing original computations in an expression dependency DAG into optimized computations in which the overhead due to scalar results computed by scalar operations, whose results are eventually consumed by a SIMD or vectorized operation, are minimized. This third modified expression dependency DAG is then used by the compiler to generate optimized code that is output to the linker for use in generating executable code.

Figure 9A:
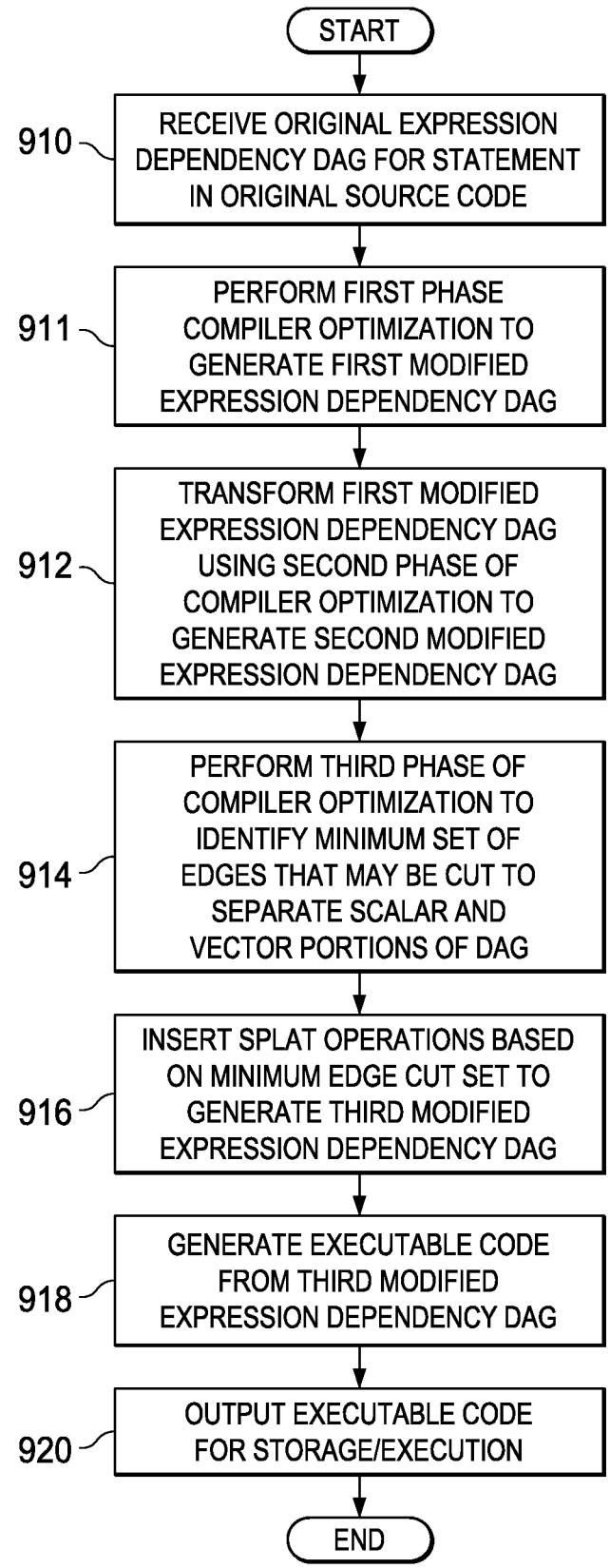
FIG. 9A provides a flowchart of the overall compiler optimization operation in accordance with one illustrative embodiment.
Figure 9B:
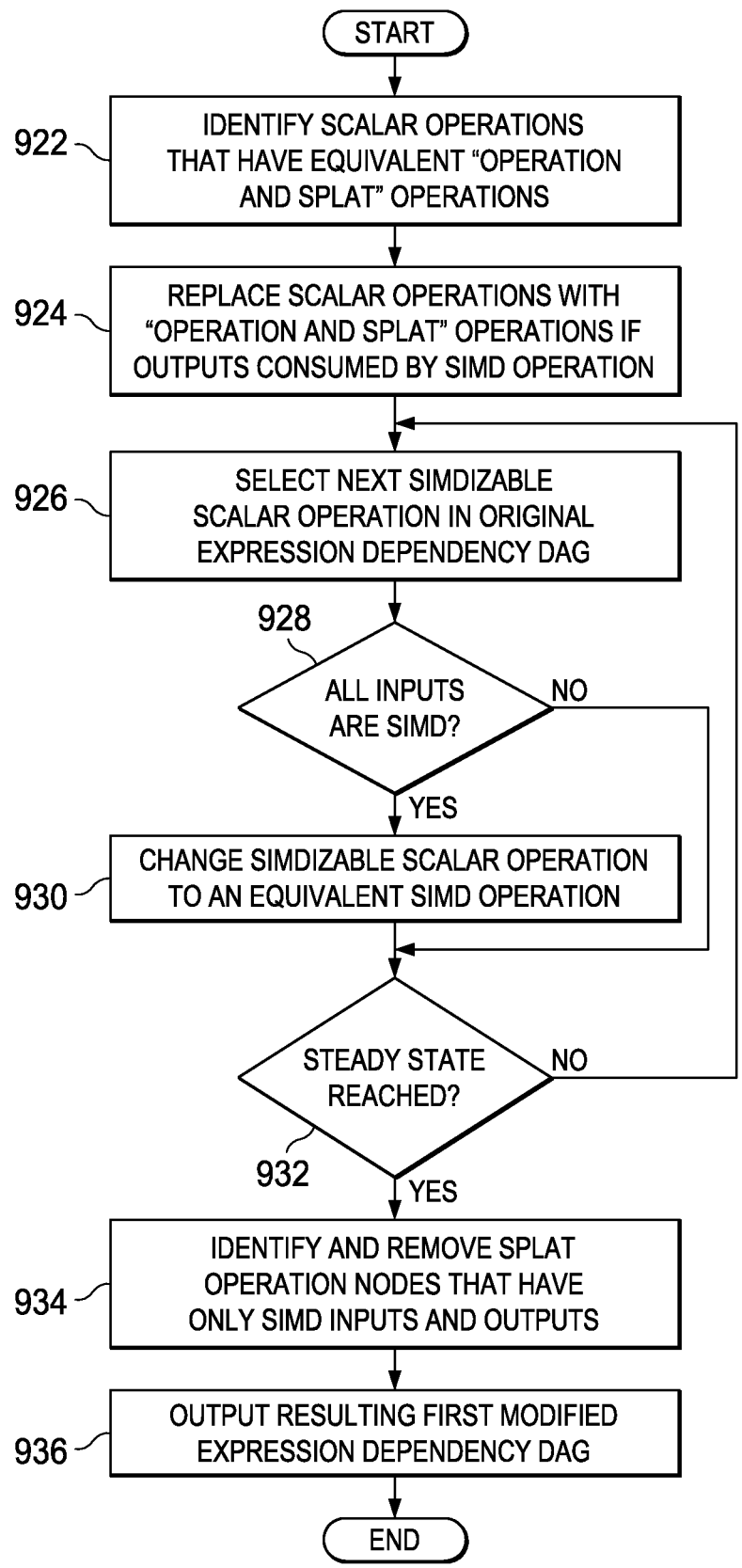
FIG. 9B provides a flowchart outlining a first phase of the compiler optimization operation in accordance with one illustrative embodiment.
Figure 9C:
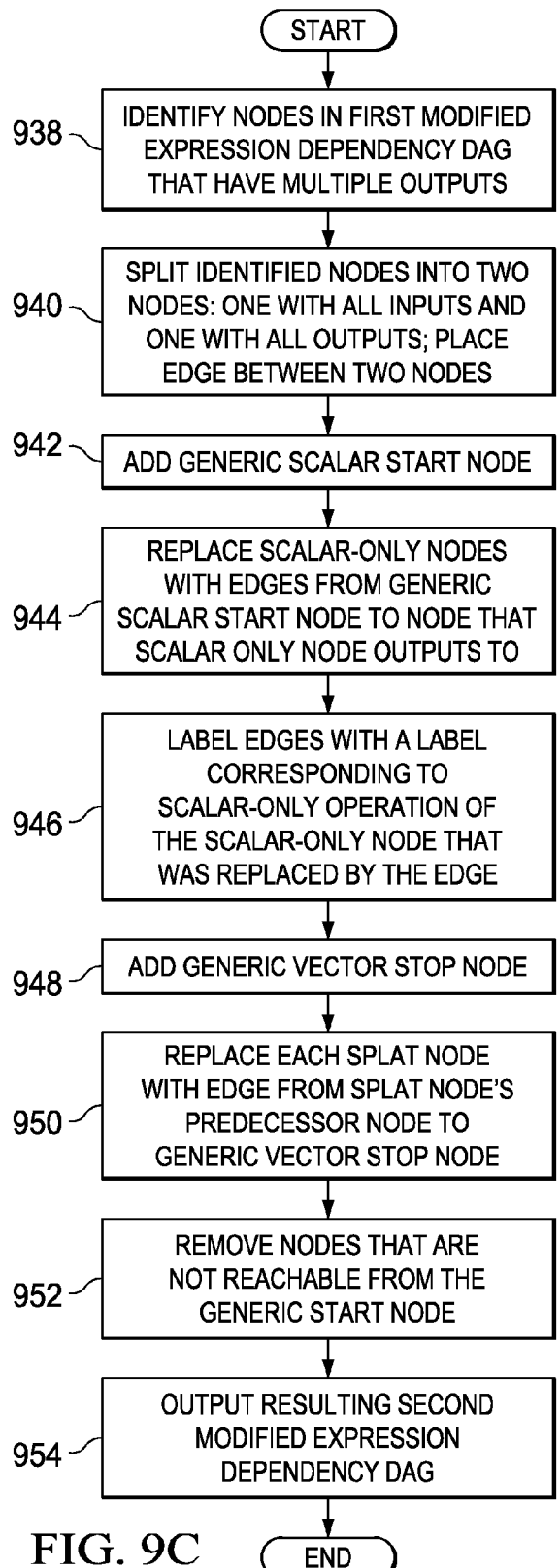
FIG. 9C provides a flowchart outlining a second phase of the compiler optimization operation in accordance with one illustrative embodiment.

FIGS. 9A-9D are flowcharts outlining a compiler optimization operation in accordance with one illustrative embodiment. FIG. 9A provides a flowchart of the overall compiler optimization operation in accordance with one illustrative embodiment. FIG. 9B provides a flowchart outlining a first phase of the compiler optimization operation in accordance with one illustrative embodiment. FIG. 9C provides a flowchart outlining a second phase of the compiler optimization operation in accordance with one illustrative embodiment.

Figure 9D:
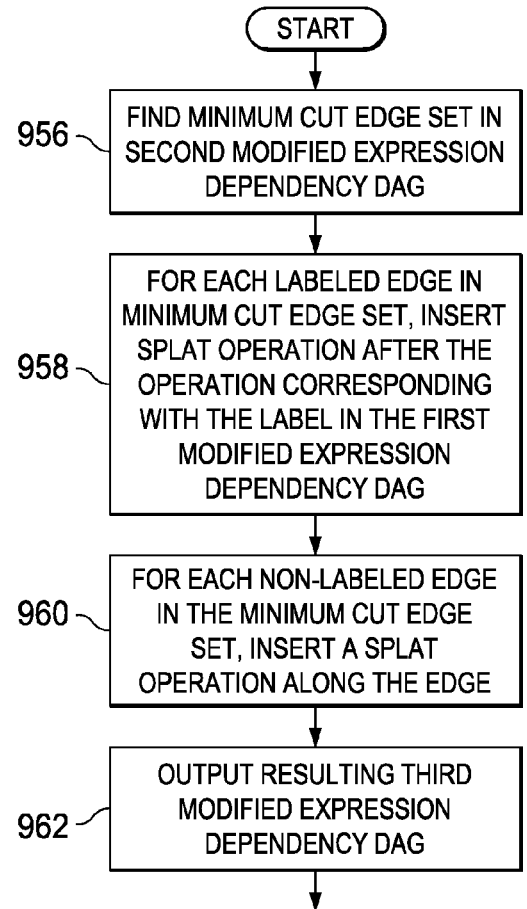
FIG. 9D provides a flowchart outlining a third phase of the compiler optimization operation in accordance with one illustrative embodiment.

FIG. 9D provides a flowchart outlining a third phase of the compiler optimization operation in accordance with one illustrative embodiment.

As shown in FIG. 9A, the overall compiler optimization operation starts with receiving an original expression dependency DAG for a statement in original source code (step 910). The original expression dependency DAG undergoes a first phase of compiler optimization in which a forward SIMD operation is performed to convert the original expression dependency DAG into a first modified expression dependency DAG where scalar operations having outputs that are consumed by vectorized or SIMD operations and which have corresponding "operation and splat" vector operations are replaced with the "operation and splat" vector operations. In addition, the first modified expression dependency DAG has SIMDizable scalar operations changed to SIMD operations if their inputs are all SIMD inputs and splat operations that have only SIMD inputs and outputs are removed (step 911).

The first modified expression dependency DAG is then transformed by a second phase of compiler optimization (step 912). This transformation transforms the first modified expression dependency DAG into a generalized expression dependency DAG that has a generic scalar start node and generic vector stop node with scalar only operation nodes being replaced with labeled edges from the generic scalar start node to the destination of the scalar only operation nodes and splat nodes being replaced with edges from a predecessor node to the generic stop node. This results in a second modified expression dependency DAG.

The second modified expression dependency DAG is then used as a basis for performing a minimum edge cut set operation to identify a minimum set of edges that may be cut to separate a scalar portion of the second modified expression dependency DAG from a vector portion (step 914). The resulting cut set is used to insert splat operations into the first modified expression dependency DAG to generate a third modified expression dependency DAG (step 916). The third modified expression dependency DAG is then used to generate executable code (step 918) which is output for either storage or execution by a processor (step 920). The operation then ends.

FIG. 9B is a flowchart outlining the first phase of compiler optimization in accordance with one illustrative embodiment. As shown in FIG. 9B, the operation starts with scalar operations that have equivalent "operation and splat" operations being identified (step 922). The scalar operations that have equivalent "operation and splat" operations and whose outputs are eventually consumed by a vectorized or SIMD operation are replaced by the corresponding "operation and splat" operation (step 924). A next SIMDizable scalar operation in the original expression dependency DAG is selected (step 926). A determination is made as to whether all the inputs to the SIMDizable scalar operation are SIMD inputs (step 928). If so, the SIMDizable scalar operation is changed to an equivalent SIMD operation (step 930). If not, or after step 930, a determination is made as to whether a steady state is reached, i.e. there are no further SIMDizable scalar operations to check (step 932). If not, the operation returns to step 926 with the next SIMDizable scalar operation being selected. If a steady state has been reached, then splat operation nodes that have only SIMD inputs and SIMD outputs are identified and removed from the original expression dependency DAG (step 934). The resulting first modified expression dependency DAG is then output (step 936).

FIG. 9C is a flowchart outlining a second phase of compiler optimization in accordance with one illustrative embodiment. As shown in FIG. 9C, the operation starts with each node in the first modified expression dependency DAG having multiple outputs being identified (step 938). Such identified nodes, if any, are split into two nodes, one with all the inputs to the original node and one with all the outputs from the original node with an edge connecting the two new nodes (step 940). A generic scalar start node is added to the first modified expression dependency DAG (step 942). Each of the scalar only nodes, i.e. non-SIMDizable scalar operation nodes, is replaced with an edge from the generic scalar start node to the node that the scalar only node outputs to (step 944). These edges are labeled with a label corresponding to the scalar only operation of the scalar only node that was replaced (step 946).

A generic vector stop node is added to the first modified expression dependency DAG (step 948). Each splat node in the first modified expression dependency DAG is replaced with an edge from the splat node's predecessor node to the generic vector stop node (step 950). Nodes that are not reachable in this modified expression dependency DAG are then removed (step 952) and the resulting second modified expression dependency DAG is output (step 954).

FIG. 9D is a flowchart of a third phase of compiler optimization in accordance with one illustrative embodiment. As shown in FIG. 9D, the operation starts by finding a minimum cut edge set in the second modified expression dependency DAG (step 956). For each labeled edge in the minimum cut edge set, a splat operation is inserted after the operation corresponding with the label in the first modified expression dependency DAG (step 958). For each non-labeled edge in the minimum cut edge set, a splat operation is placed along that edge (step 960). For nodes that were split in step 940 in FIG. 9C, if the minimum cut edge set selected an edge added in step 940 in FIG. 9C, then a splat operation is added after the operation corresponding to the split node in the original graph. The resulting third modified expression dependency DAG is then output (step 962). The operation then terminates.

Thus, the illustrative embodiments provide mechanisms for optimizing code for execution in a SIMD processor. The optimizations involve replacing scalar operation and splat operations with a combined vector operation and splat operation where possible. The optimizations further involve determining an optimum placement of separate splat operations within an expression dependency DAG of a code statement so as to minimize the overhead associated with executing the code statement. In essence, this optimization minimizes the number of separate splat operations as well as places them in the least costly portions of the expression dependency DAG. The result is executable code that minimizes the number of processor cycles consumed performing splat operations.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing scalar code executed on a single instruction multiple data (SIMD) engine of the data processing system, comprising:
   determining placement of vector operation-splat operations based on an identification of scalar and SIMD operations in an original code representation, wherein each vector operation-splat operation is a single operation that performs a combination of a vector operation and a splat operation without performing a separate vector operation and separate splat operation;
   modifying the original code representation to include the vector operation-splat operations based on the determined placement of vector operation-splat operations to generate a first modified code representation;
   determining placement of separate splat operations based on identification of scalar and SIMD operations in the first modified code representation;
   modifying the first modified code representation to insert or delete separate splat operations based on the determined placement of the separate splat operations to generate a second modified code representation; and
   outputting SIMD code based on the second modified code representation for execution by the SIMD engine.

2. The method of claim 1, wherein determining placement of vector operation-splat operations comprises:
   identifying, in the original code representation, a scalar operation having an output that leads into a SIMD operation; and
   replacing, in the first modified code representation, the scalar operation with a corresponding vector operation-splat operation.

3. The method of claim 1, further comprising:
   identifying a SIMDizable scalar operation in the original code representation;
   determining if all of the inputs to the SIMDizable scalar operation are SIMD inputs; and
   replacing, in the first modified code representation, the SIMDizable scalar operation in the original code representation with a corresponding SIMD operation.

4. The method of claim 1, further comprising:
   identifying separate splat operations that have only SIMD inputs and SIMD outputs; and
   removing, in the first modified code representation, separate splat operations that have only SIMD inputs and SIMD outputs.

5. The method of claim 1, further comprising:
identifying a first node in the first modified code representation that has multiple outputs into a plurality of nodes;
separating, in an intermediate modified code representation, the first node into a second node having all of the inputs to the first node, and a third node having all of the outputs of the first node; and
adding an edge, in an intermediate modified code representation, between the second node and the third node.

6. The method of claim 5, further comprising:
adding a generic scalar start node to the intermediate modified code representation; and
replacing, in the intermediate modified code representation, a non-SIMDizable node with a labeled edge from the generic scalar start node to a node coupled to the output of the non-SIMDizable node.

7. The method of claim 6, further comprising:
adding a generic vector stop node to the intermediate modified code representation; and
replacing, in the intermediate modified code representation, a splat node associated with a separate splat operation, by an edge from a predecessor node of the splat node to the generic vector stop node.

8. The method of claim 7, further comprising:
removing one or more nodes in the intermediate modified code representation that are not reachable from the generic scalar start node.

9. The method of claim 8, wherein determining placement of separate splat operations based on identification of scalar and SIMD operations in the first modified code representation comprises obtaining a minimum edge cut set for the intermediate modified code representation.

10. The method of claim 9, wherein modifying the first modified code representation to insert or delete separate splat operations based on the determined placement of the separate splat operations to generate a second modified code representation comprises:
inserting separate splat operations in the first modified code representation based on edges in the minimum edge cut set for the intermediate modified code representation.

11. A computer program product comprising a non-transitory computer readable medium having a computer readable program recorded thereon, wherein the computer readable program, when executed on a computing device, causes the computing device to:
determine placement of vector operation-splat operations based on an identification of scalar and single instruction multiple data (SIMD) operations in an original code representation, wherein each vector operation-splat operation is a single operation that performs a combination of a vector operation and a splat operation without performing a separate vector operation and separate splat operation;
modify the original code representation to include the vector operation-splat operations based on the determined placement of vector operation-splat operations to generate a first modified code representation;
determine placement of separate splat operations based on identification of scalar and SIMD operations in the first modified code representation;
modify the first modified code representation to insert or delete separate splat operations based on the determined placement of the separate splat operations to generate a second modified code representation; and
output SIMD code based on the second modified code representation for execution by the SIMD engine.

12. The computer program product of claim 11, wherein the computer readable program causes the computing device to determine placement of vector operation-splat operations by:
identifying, in the original code representation, a scalar operation having an output that leads into a SIMD operation; and
replacing, in the first modified code representation, the scalar operation with a corresponding vector operation-splat operation.

13. The computer program product of claim 11, wherein the computer readable program further causes the computing device to:
identify a SIMDizable scalar operation in the original code representation;
determine if all of the inputs to the SIMDizable scalar operation are SIMD inputs; and
replace, in the first modified code representation, the SIMDizable scalar operation in the original code representation with a corresponding SIMD operation.

14. The computer program product of claim 11, wherein the computer readable program further causes the computing device to:
identify separate splat operations that have only SIMD inputs and SIMD outputs; and
remove, in the first modified code representation, separate splat operations that have only SIMD inputs and SIMD outputs.

15. The computer program product of claim 11, wherein the computer readable program further causes the computing device to:
identify a first node in the first modified code representation that has multiple outputs into a plurality of nodes;
separate, in an intermediate modified code representation, the first node into a second node having all of the inputs to the first node, and a third node having all of the outputs of the first node; and
add an edge, in an intermediate modified code representation, between the second node and the third node.

16. The computer program product of claim 15, wherein the computer readable program further causes the computing device to:
add a generic scalar start node to the intermediate modified code representation; and
replace, in the intermediate modified code representation, a non-SIMDizable node with a labeled edge from the generic scalar start node to a node coupled to the output of the non-SIMDizable node.

17. The computer program product of claim 16, wherein the computer readable program further causes the computing device to:
add a generic vector stop node to the intermediate modified code representation; and
replace, in the intermediate modified code representation, a splat node associated with a separate splat operation, by an edge from a predecessor node of the splat node to the generic vector stop node.

18. The computer program product of claim 17, wherein the computer readable program further causes the computing device to:
remove one or more nodes in the intermediate modified code representation that are not reachable from the generic scalar start node.

19. The computer program product of claim 18, wherein the computer readable program causes the computing device to determine placement of separate splat operations based on identification of scalar and SIMD operations in the first modified code representation by obtaining a minimum edge cut set for the intermediate modified code representation.

20. The computer program product of claim 19, wherein the computer readable program causes the computing device to modify the first modified code representation to insert or delete separate splat operations based on the determined placement of the separate splat operations to generate a second modified code representation by:
inserting separate splat operations in the first modified code representation based on edges in the minimum edge cut set for the intermediate modified code representation.

21. An apparatus, comprising:
a processor; and
a memory coupled to the processor, wherein the memory comprises instructions which, when executed by the processor, cause the processor to:
determine placement of vector operation-splat operations based on an identification of scalar and single instruction multiple data (SIMD) operations in an original code representation, wherein each vector operation-splat operation is a single operation that performs a combination of a vector operation and a splat operation without performing a separate vector operation and separate splat operation;
modify the original code representation to include the vector operation-splat operations based on the determined placement of vector operation-splat operations to generate a first modified code representation;
determine placement of separate splat operations based on identification of scalar and SIMD operations in the first modified code representation;
modify the first modified code representation to insert or delete separate splat operations based on the determined placement of the separate splat operations to generate a second modified code representation; and
output SIMD code based on the second modified code representation for execution by the SIMD engine.

* * * * *